United States Patent [19]

Maeda et al.

[11] Patent Number: 4,791,586

[45] Date of Patent: Dec. 13, 1988

[54] METHOD OF AND APPARATUS FOR CHECKING GEOMETRY OF MULTI-LAYER PATTERNS FOR IC STRUCTURES

[75] Inventors: Shunji Maeda, Yokohama; Hitoshi Kubota, Fujisawa; Satoru Fushimi, Yokohama; Hiroshi Makihira, Yokohama; Takanori Ninomiya, Yokohama; Yasuo Nakagawa, Chigasaki, all of Japan

[73] Assignee: Hitachi, Ltd., Tokyo, Japan

[21] Appl. No.: 812,928

[22] Filed: Dec. 23, 1985

[30] Foreign Application Priority Data

Dec. 26, 1984 [JP] Japan .................. 59-273052
Mar. 18, 1985 [JP] Japan .................. 60-52272

[51] Int. Cl.$^4$ ............................................. G06K 9/00
[52] U.S. Cl. ..................... 364/491; 364/490; 356/394; 356/237; 382/34
[58] Field of Search .............. 364/491, 507, 552, 488, 364/489, 490, 571; 382/8, 21, 27, 34; 356/237, 394; 358/106, 101; 324/73 PC

[56] References Cited

U.S. PATENT DOCUMENTS

| | | | |
|---|---|---|---|
| 4,347,001 | 8/1982 | Levy et al. | 356/398 |
| 4,448,532 | 5/1984 | Joseph et al. | 356/394 |
| 4,500,202 | 2/1985 | Smyth | 356/394 |
| 4,528,634 | 7/1985 | Nakahata et al. | 364/491 |
| 4,532,650 | 7/1985 | Wihl et al. | 358/106 |
| 4,559,603 | 12/1985 | Yoohikawa | 364/491 |
| 4,570,180 | 2/1986 | Baier et al. | 382/22 |
| 4,579,455 | 4/1986 | Levy et al. | 356/394 |
| 4,618,938 | 10/1986 | Sandland et al. | 364/491 |
| 4,628,531 | 12/1986 | Okamoto et al. | 382/34 |
| 4,669,123 | 5/1987 | Kobayashi et al. | 382/21 |

FOREIGN PATENT DOCUMENTS 0041870  12/1981  European Pat. Off. ............ 364/491

OTHER PUBLICATIONS

Tsujiyama et al., "A Highly Reliable Mask Inspection System", *IEEE Transactions on Electron Devices*, vol. ED-27, No. 7, Jul. 1980, pp. 1284–1290.

Primary Examiner—Parshotam S. Lall
Assistant Examiner—V. N. Trans
Attorney, Agent, or Firm—Antonelli, Terry & Wands

[57] ABSTRACT

Method of and apparatus for checking the geometry of multi-layer patterns for IC structures having identical functions, each of the multi-layer patterns including layer patterns arranged in different level layers, wherein electrical image signals corresponding to any two of the multi-layer patterns and having more than two levels are registered with each other and then compared to determine unmatched and matched portions. The comparison of the registered electric image signals may be performed with respect to their amplitude or their gradients. The registration and comparison of two electric image signals may be repeated for all of the layer patterns with the matched portions being no longer subjected to the registration and comparison. A defect detection signal is produced from finally unmatched portions, if any, of the electric image signals having undergone the said registration and comparison.

30 Claims, 27 Drawing Sheets

MULTI-PATTERN $f_1$

1ST LAYER PATTERN

2ND LAYER PATTERN

MULTI-PATTERN $g_1$

1ST LAYER PATTERN

DEFECT

2ND LAYER PATTERN

UNMATCHING BETWEEN PATTERNS $f_1$ AND $g_1$

DEFECT

FIG. 4A
MULTI-LAYER PATTERN f2
FIG. 4B
MULTI-LAYER PATTERN g2
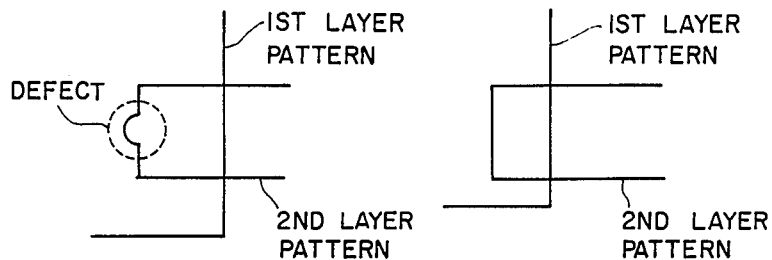
FIG. 4C
REGISTRATION OF PATTERNS f2 AND g2 WITH RESPECT TO 1ST LAYER PATTERN
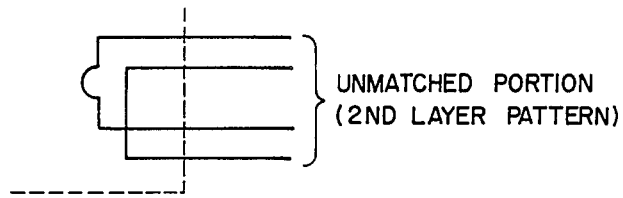
FIG. 4D
REMOVAL OF 1ST LAYER PATTERN (MATCHED PORTION)
FIG. 4E
MULTI-LAYER PATTERN g2 (IDENTICAL WITH FIG.1B)
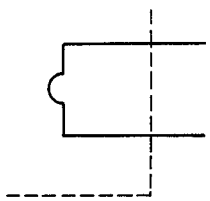
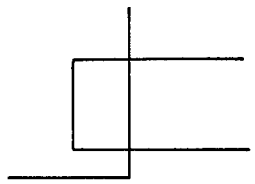
FIG. 4F
REGISTRATION OF PATTERNS f2 AND g2 WITH RESPECT TO 2ND LAYER
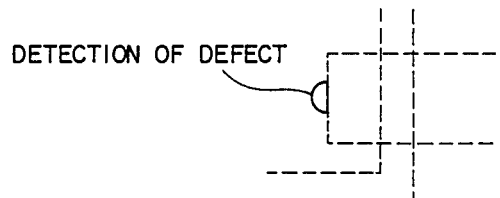

FIG.5A
MULTI-LAYER PATTERN f3
FIG.5B
MULTI-LAYER PATTERN 93
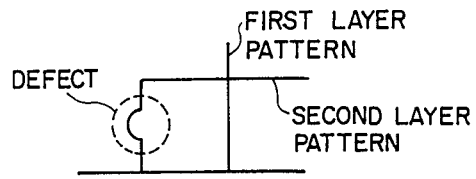
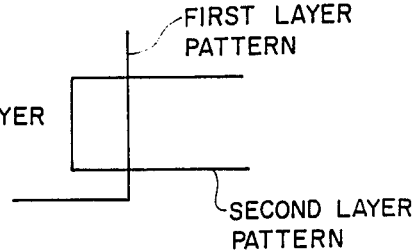
FIG.5C
REGISTRATION OF PATTERNS f3 AND 93 WITH RESPECT TO 1ST LAYER
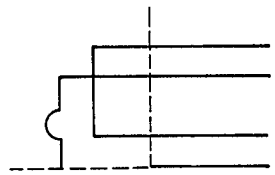
FIG.5D
REMOVAL OF 1ST LAYER PATTERN (MATCHED PORTION)
FIG.5E
MULTI-LAYER PATTERN 93 (IDENTICAL WITH FIG.5B)
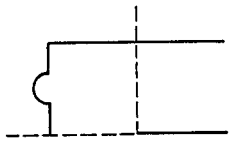
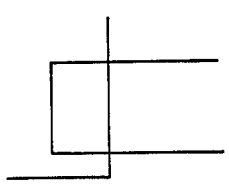
FIG.5F
REGISTRATION OF PATTERNS f3 AND 93 WITH RESPECT TO 2ND LAYER
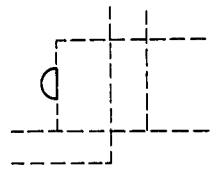

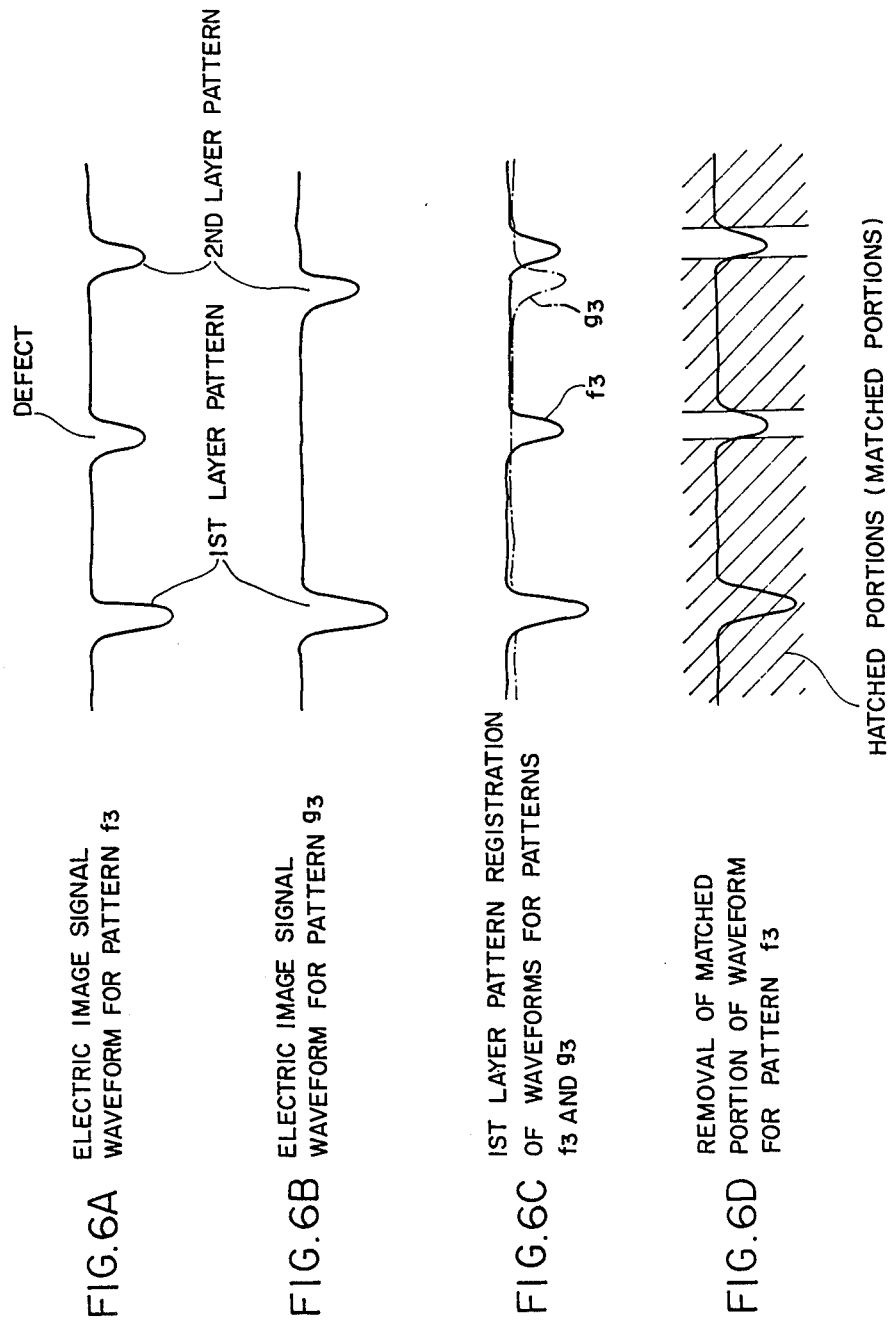

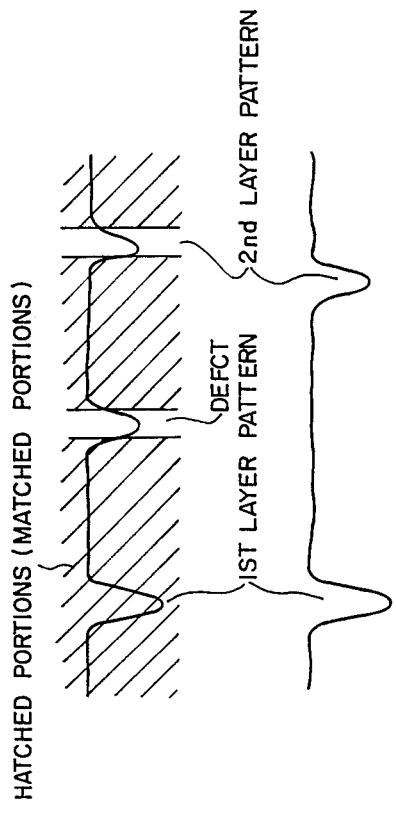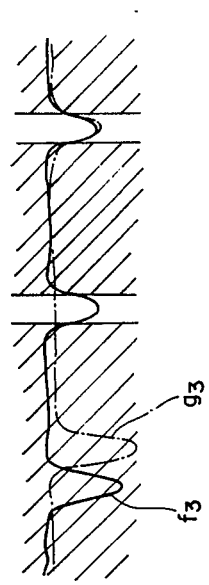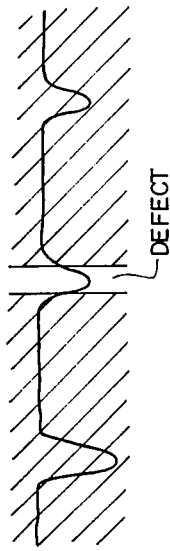
FIG. 7A WAVEFORM FOR PATTERN f3
FIG. 7B WAVEFORM FOR PATTERN g3
FIG. 7C 2ND LAYER PATTERN REGISTRATION OF WAVEFORMS FOR PATTERNS f3 AND g3
FIG. 7D REMOVAL OF MATCHED PORTION OF WAVEFORM FOR PATTERN f3

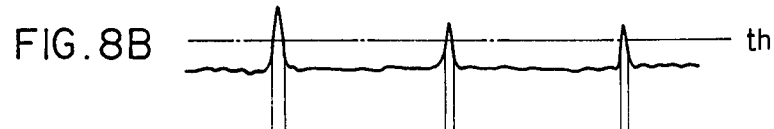
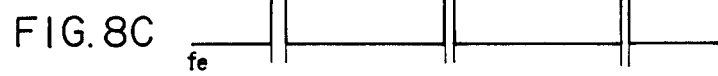
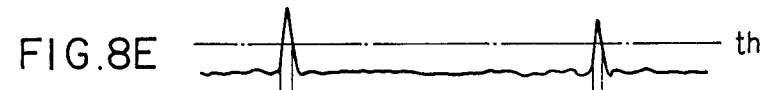
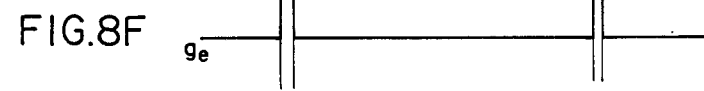

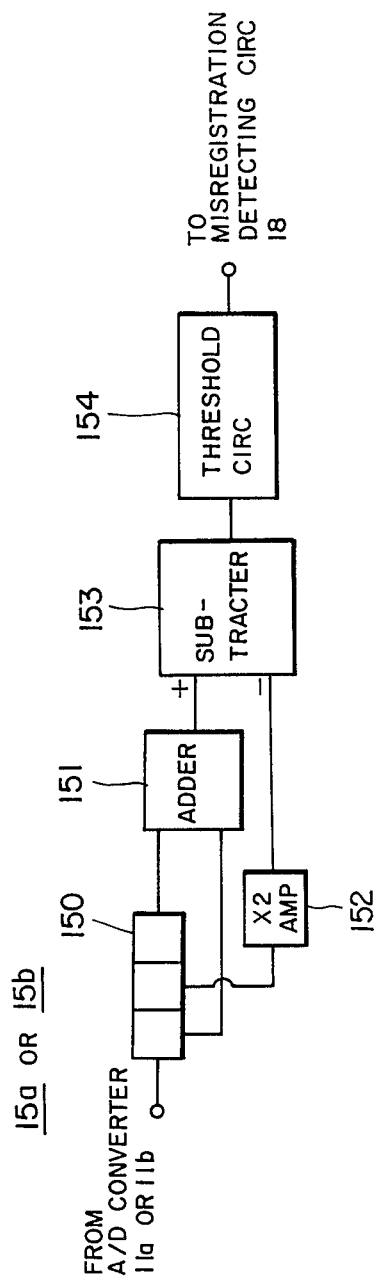

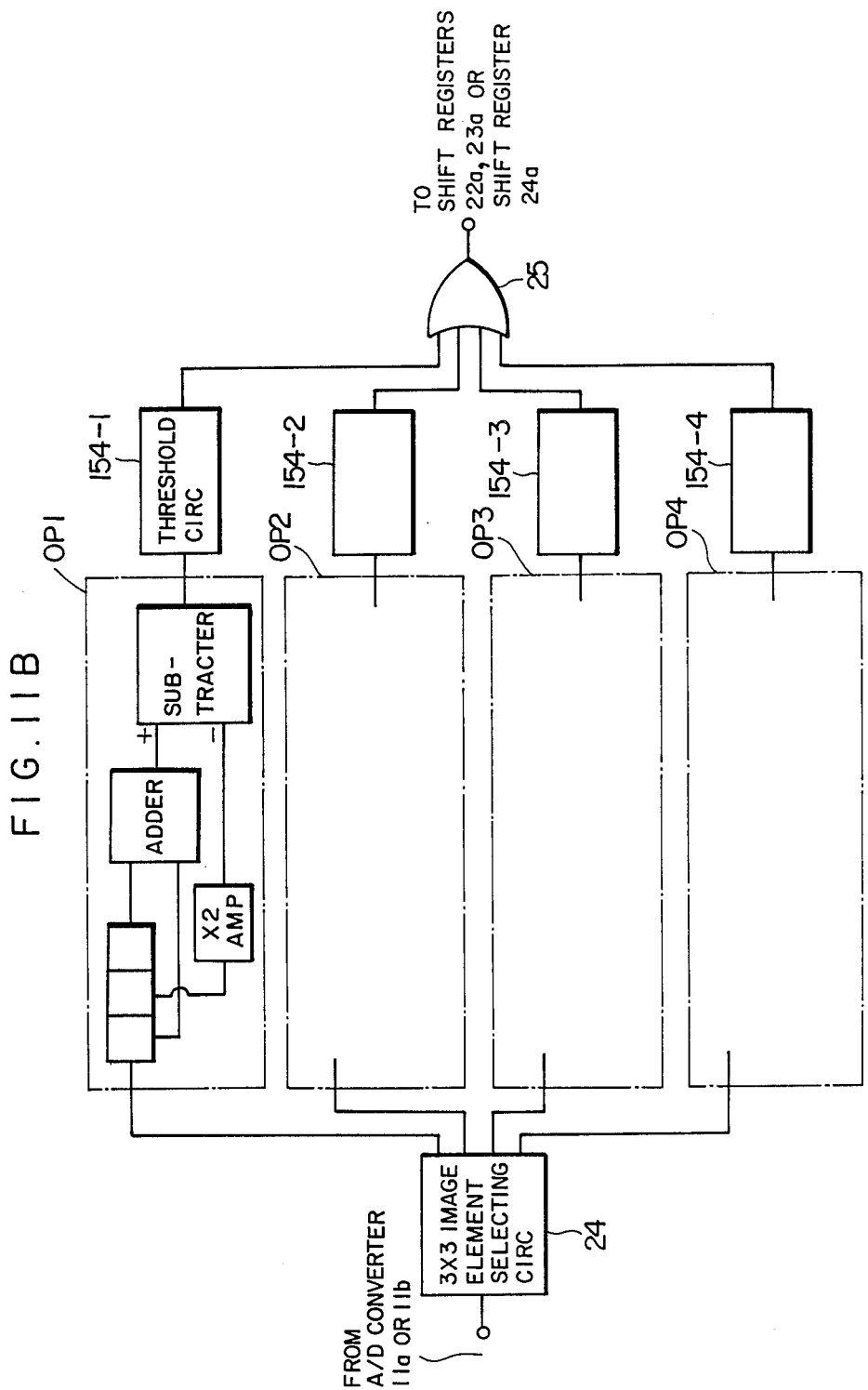

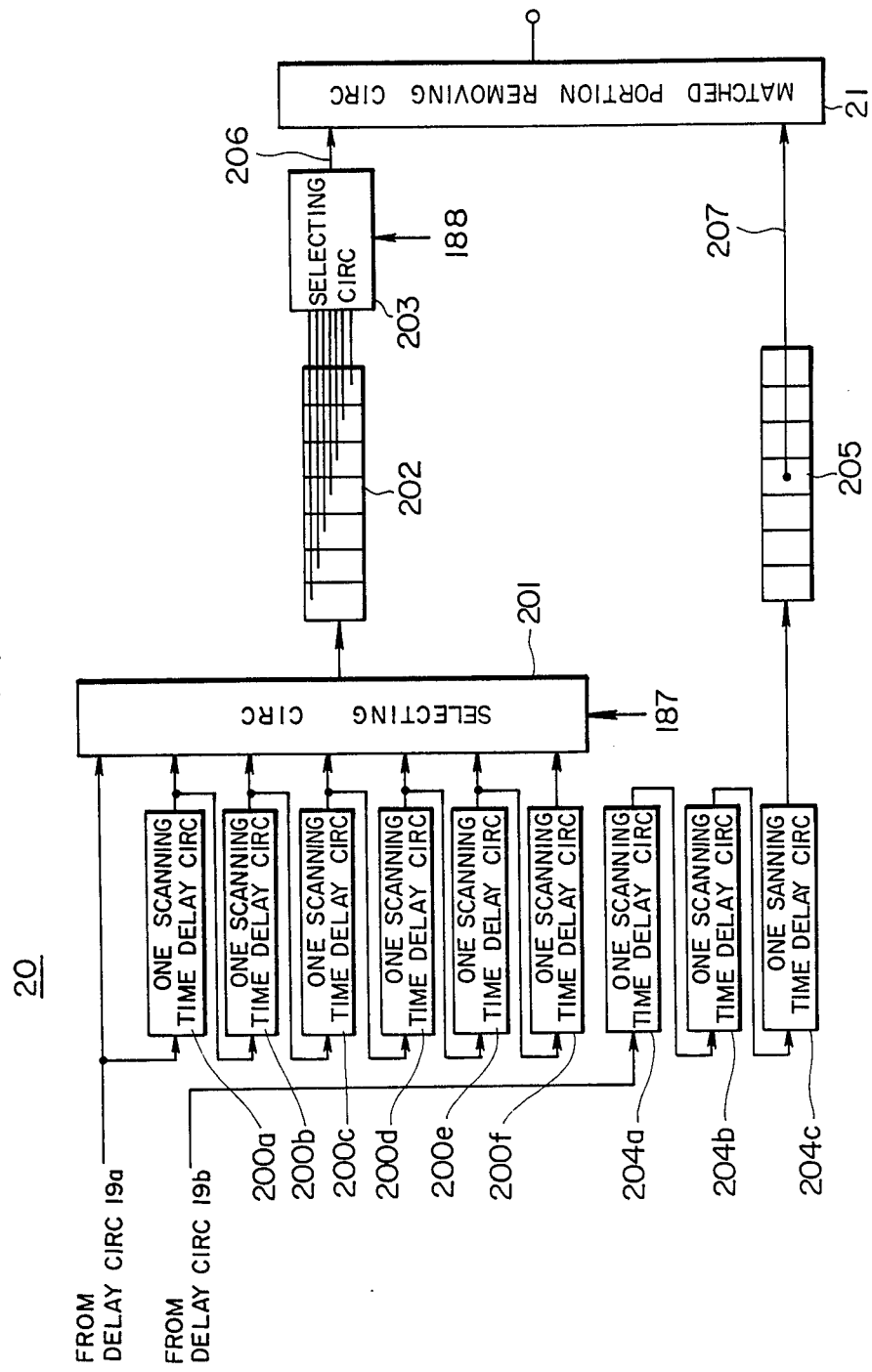

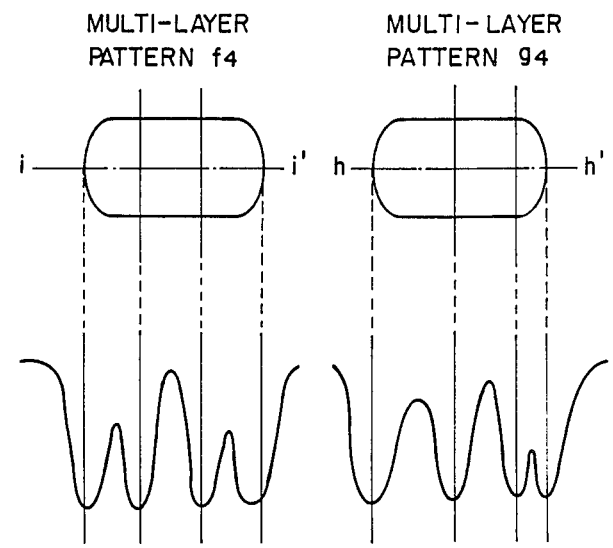
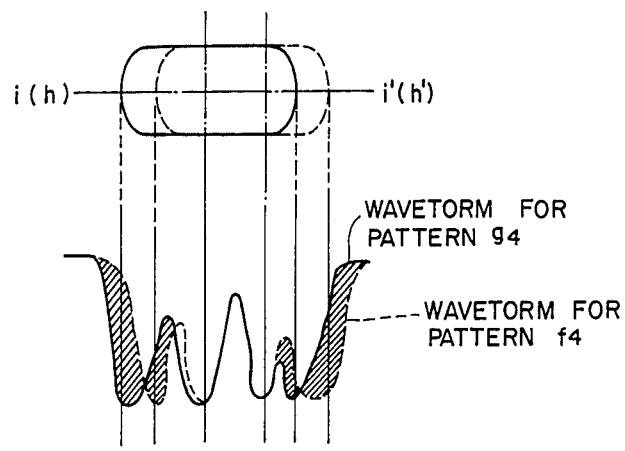

WAVEFORM PATTERN f4

WAVEFORM FOR PATTERN g4

THRESHOLD th₁

FIG. 18A　　FIG. 18B
PATTERN f6　　PATTERN g6
 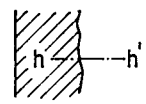
FIG. 18C
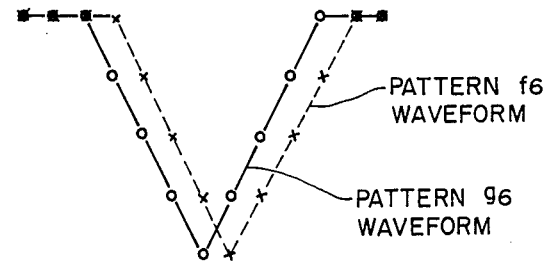
FIG. 18D
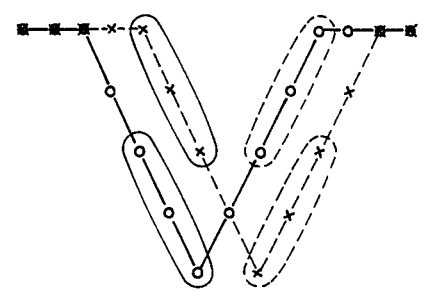
FIG. 18E
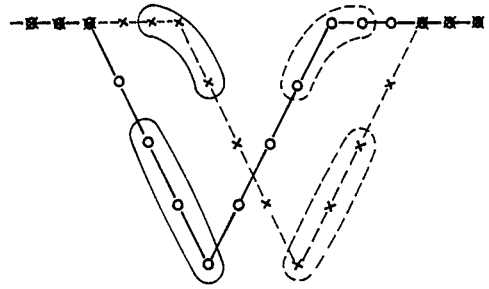

FIG. 19A  FIG. 19B
PATTERN f7   PATTERN g7
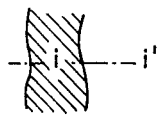
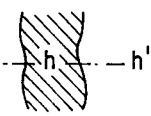
FIG. 19C
PATTERN g7 WAVEFORM
PATTERN f7 WAVEFORM
GRADIENTS IDENTICAL
FIG. 20A  FIG. 20B
PATTERN f8   PATTERN g8
DISCONNECTION
FIG. 20C
PATTERN g8 WAVEFORM
PATTERN f8 WAVEFORM
GRADIENTS DIFFERENT

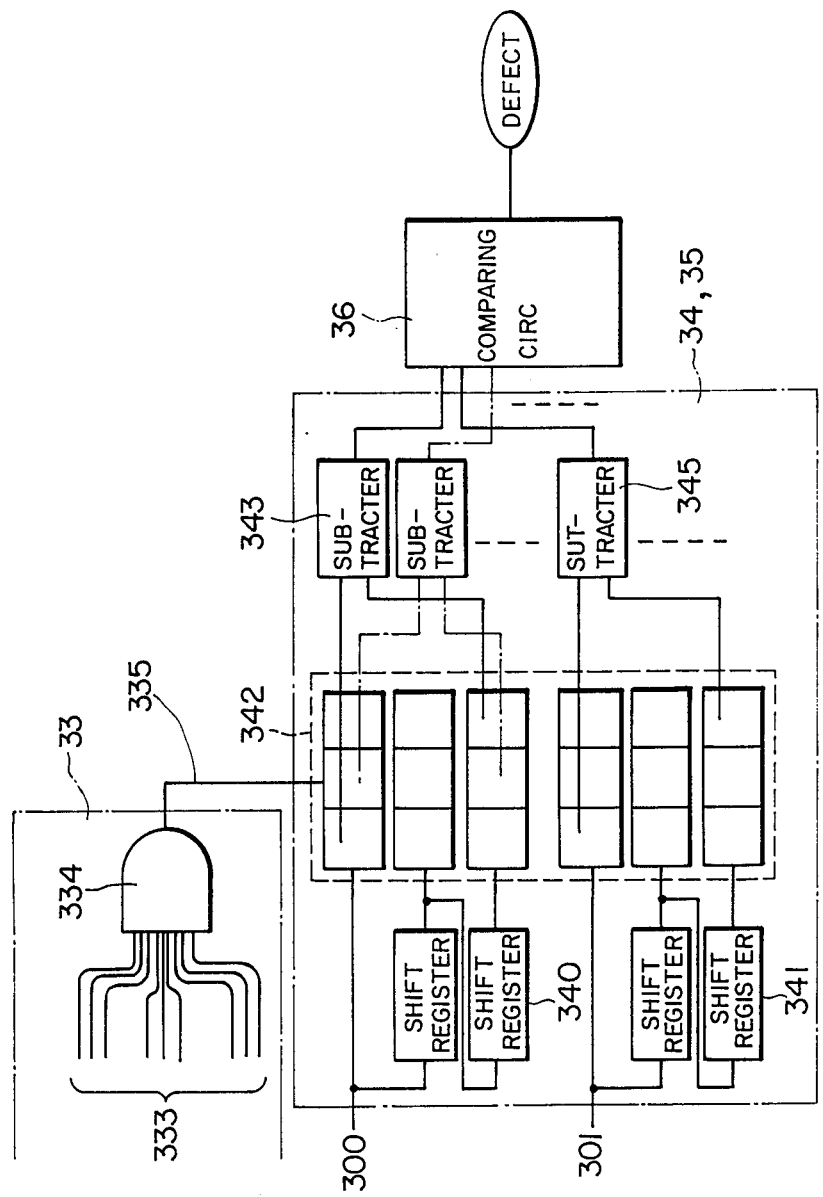

GRADIENT COMPARISON TABLE

| B−H |
| D−F |
| G−C |
| I−A |

3×3 WINDOW

| A | B | C |
| D | E | F |
| G | H | I |

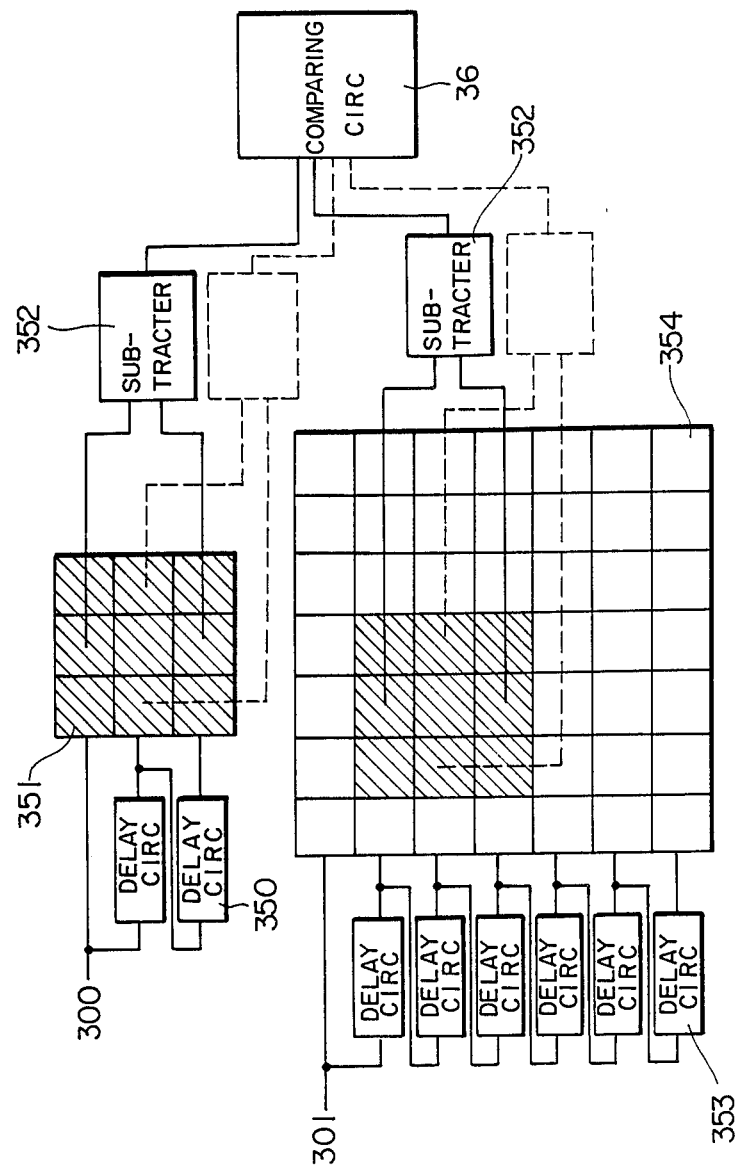

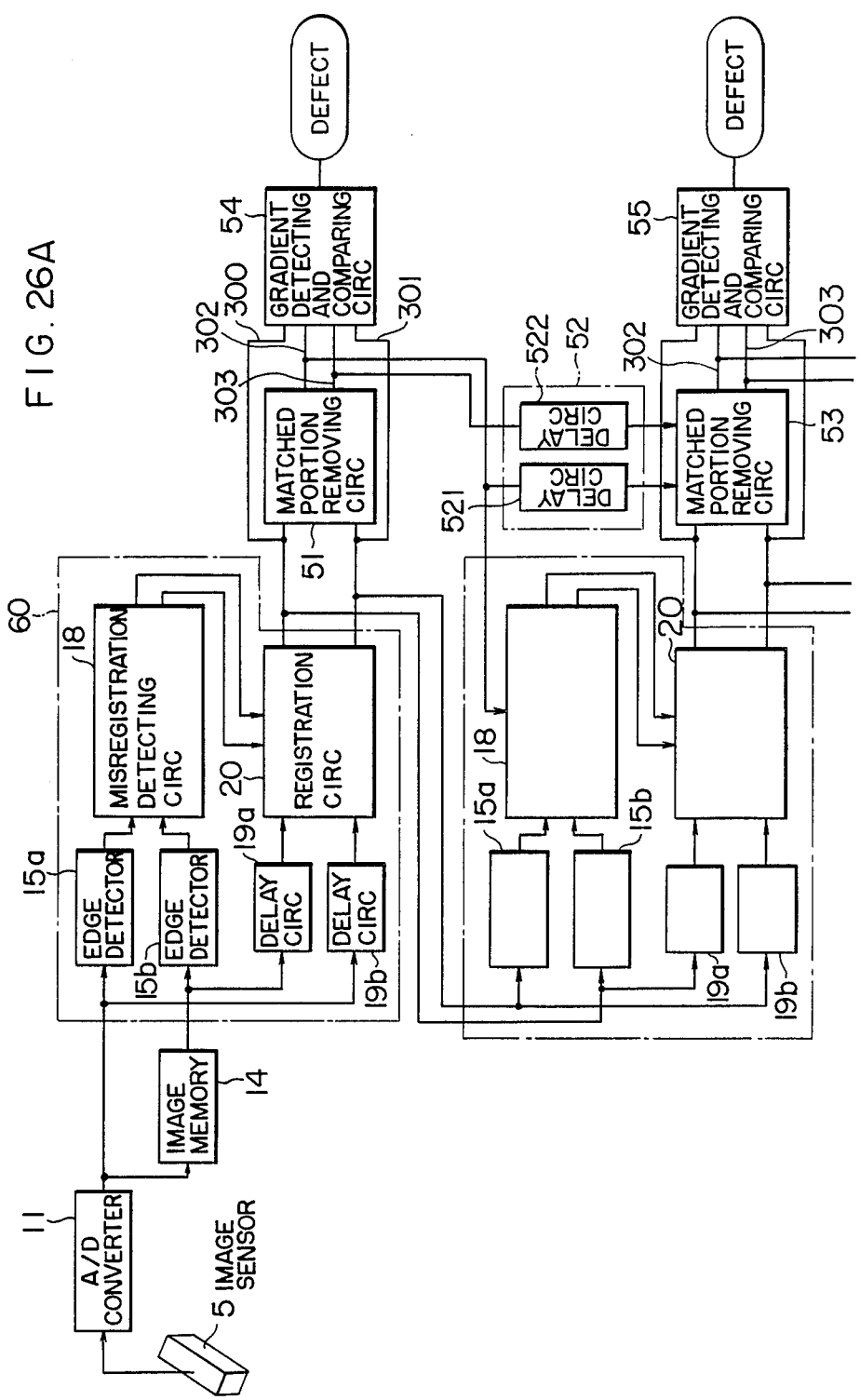

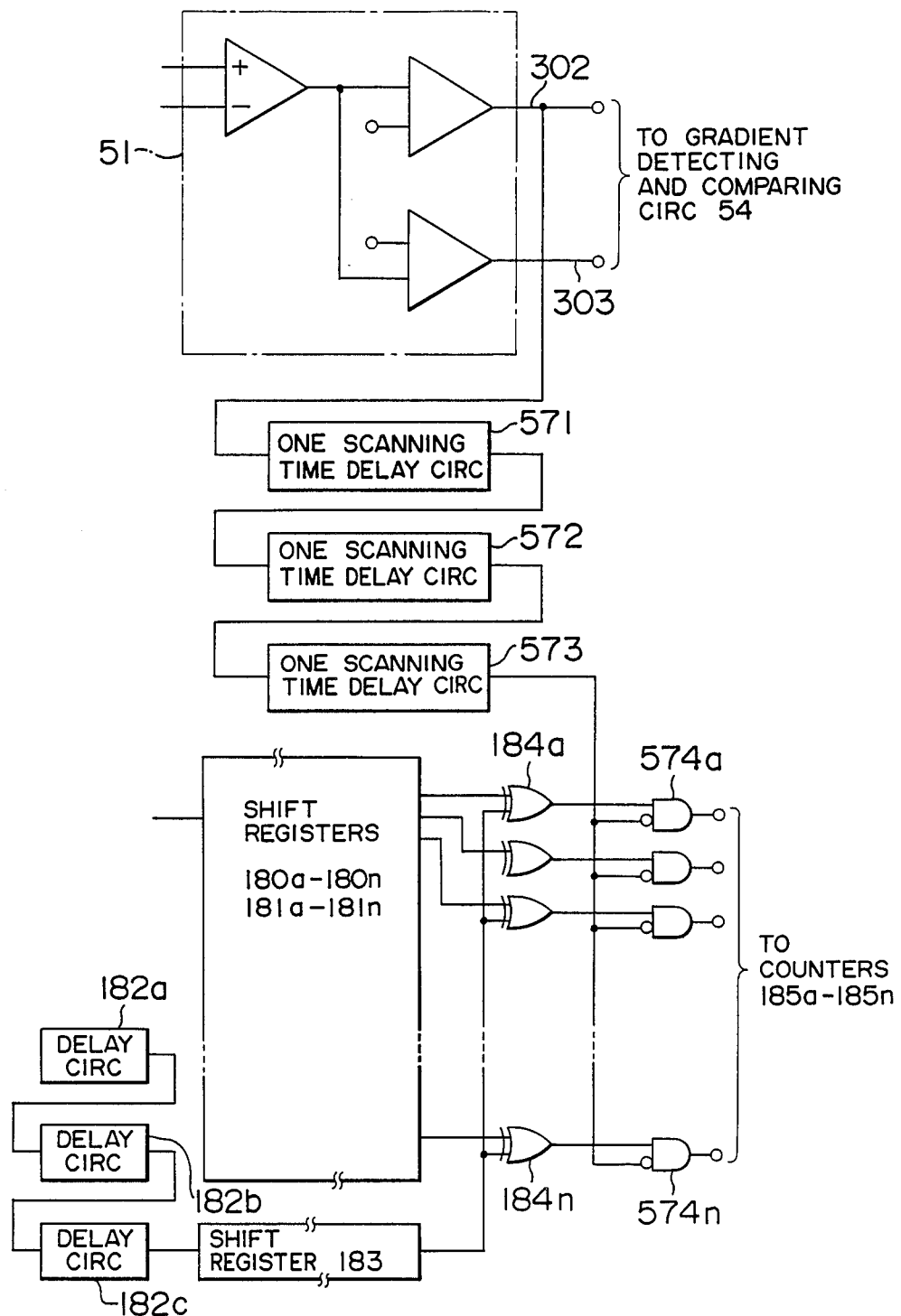

METHOD OF AND APPARATUS FOR CHECKING GEOMETRY OF MULTI-LAYER PATTERNS FOR IC STRUCTURES

BACKGROUND OF THE INVENTION

This invention relates to a method of and an apparatus for checking the geometry of multi-layer patterns for semiconductor structures such as for example LSI wafers.

Integrated circuits such as LSIs have a tendency to high integration and size reduction. It is frequent that defects occur in fine patterns of the integrated circuits during production of these patterns in spite of the fact that the patterns are carefully handled. Therefore, these patterns must be checked in detail.

Further, in a conventional checking process, many inspectors participate in checking the presence or absence of a small defect with the eye by using a microscope. But through repeated inspections, the inspector becomes tired with eyes to overlock defects, and reliability is restricted from the standpoint of quality control. The manual inspection, on the other hand, disturbs flow of production and becomes a cause for degrading productivity. Thus, with a view of improving quality insurance and productivity, it is a very important task to automate checking processes.

Patterns on a semiconductor device which can be an object to be checked in accordance with the present invention has a complicated three-dimensional structure as exemplified in FIG. 1. In checking such a three-dimensional structure, a conventional checking apparatus often fails to fulfill itself satisfactorily. For example, in a conventional apparatus as shown in FIG. 2, linear image sensors 5a and 5b have each a self-scanning function in the longitudinal direction and detect a one-dimensional pattern. An LSI wafer 1 is moved by an XY table 7 in a direction orthogonal to the linear image sensor scanning so that a two-dimensional patterns on a chip 2 can be detected. Objectives 4a and 4b focus illumination light beams 3a and 3b on the chip and defects enlarged chip patterns, and electric signals from the image sensors 5a and 5b are converted into digital signals by means of A/D converters 11a and 11b. The digital signals are converted by threshold circuits 12a and 12b into binary signals which in turn are fed to a collating circuit 13.

With the conventional apparatus for checking the geometry of wafer configured as above, the collating circuit 13 treats the binary signals and hence, the checking is grounded on an essential premise that two circuit patterns to be detected by the image sensors 5a and 5b are identical to each other.

In other words, it is a requisite that no misregistration exist between two detected image signals and only when this requisite is satisfied, the conventional binary comparison becomes valid.

Since, dependent on such factors as accuracies of an XY table carrying an object to be checked, accuracies of chip arrangement and thermal deformation of optical and mechanical system, misregistration inevitably occurs between input patterns it has been practice that the misregistration between the input patterns is measured and corrected to perform defect judgement. However, because of the threedimensional structure of patterns, an object to be checked may involve misregistration even between first and second layers thereof, that is, an inter-layer alignment error, with the result that a defect which is identical in size to or smaller than the inter-layer alignment error, even though being fatal, can not be discriminated from the interlayer alignment error. The inter-layer alignment error is a kind of misregistration which is inevitably caused when forming the patterns. However, according to the conventional method of detecting unmatching, a fine defect is covered with the inter-layer misregistration and is impossible to detect.

A conventional apparatus has been available, having a shift register for correcting misregistration, which shift register is however for compensating for errors in conversion of images into binary signals and can not meet improvements in accuracies of checking finely formed objects.

Specifically, when as shown in FIGS. 3A and 3B misregistration (alignment error) exists between a first layer pattern and a second layer pattern of a multi-layer pattern $f_1$ on an object to be checked, for example, a semiconductor device in relation to another multi-layer pattern $g_2$ on another object, a defect which is approximately identical in size to or smaller than the inter-layer alignment error can not be detected. When forming the multi-layer patterns, the misregistration standing for the inter-layer alignment error is inevitable. Thus, the unmatching detection following the registration according to the conventional techniques provides a result as shown in FIG. 3C, indicating that the detection of the defect alone is impossible.

In addition, the pattern is sometimes accompanied by fine unevenness or variations in width which constitute defects that can not be detected with only the conventional misregistration correcting means. Detection of such defects is also desired.

Known examples of inventions concerning registration are dssclosed in Japanese Patent Unexamined Publication Nos. 57-34402 and 57-196377.

Japanese Patent Unexamined Publication No. 58-46636 describes registration of a mask which is of a one-layer pattern. The mask not being of a multi-layer pattern never faces a problem of the inter-layer alignment error, and therefore a measure disclosed in the aforementioned publication will not be applied to a wafer which is an object to be checked in the present invention.

SUMMARY OF THE INVENTION

The present invention intends to solve the tasks raised by the conventional techniques and has for its object to provide a method of and an apparatus for accurately checking the geometry of multi-layer patterns even when inter-layer alignment errors exists in respect of two multi-layer patterns to be compared.

Another object of this invention is to provide a method of and an apparatus for accurately checking the geometry of multi-layer patterns even when inter-layer alignment errors and fine unevenness exist in respect of two multi-layer patterns to be compared.

Still another object of the invention is to provide a method of and an apparatus for checking the geometry of multi-layer patterns which can suitably be automated.

According to one aspect of the invention, in checking the geometry of multi-layer patterns, (1) an electric signal other than a binary signal and representative of the optical darkness of a multi-layer pattern on one chip which pattern may have rather a weak contrast is compared with another similar electric signal representative of another multi-layer pattern on an adjacent chip which pattern may also have rather a weak contrast; (2) to eliminate the influence of the inter-layer alignment error, the multi-layer pattern on the one chip is registered with that on the adjacent chip with respect to each layer pattern and compared; and (3) the respective layer patterns are serially checked until checking of the entire layer patterns is completed, by making a portion recognized as being matched in the comparison in (2) above a "Don't Care" (dead) region to be masked.

According to another aspect of the invention, in checking the geometry of multi-layer patterns, images of objects to be checked are converted into multi-level signals within predetermined regions, and a fine defect is detected from gradients in brightness or darkness of the multi-level signals. Regions of the objects to be checked having large amounts of unmatching are recognized as defect candidates. The defect candidates are compared with each other by comparing a plurality of pixels (image elements) within a window. In an embodiment, the window is applied to 3×3 pixels but may otherwise be applied to a different number of pixels such as 2×2 pixels. By directly comparing patterns on two chips to detect defect candidates and applying the window of minimum unit for defect detection to the defect candidates to compare characteristics within the window, a defect can advantageously be detected under no influence of the pattern configuration and inter-layer alignment error. (Further, the size of the window may be selected to be equal to that of a minimum defect to be detected and the scale of hardware can be minimized.)

BRIEF DESCRIPTION OF THE DRAWINGS

FIGS. 4A to 7D are diagrams for explaining defect detection according to one aspect of the invention.

FIGS. 8A to 8F and FIG. 9 are diagrams for explaining edge detection for registration.

Figs. 11A and 11B are block diagrams of edge detectors which may be used in the embodiment of the invention.

FIG. 13 is a block diagram showing an example of a registration circuit usable in the embodiment of the invention.

FIGS. 15A to 15C are diagrams illustrative of registration between two multi-layer patterns.

FIGS. 18A to 20C are diagrams showing examples of three types of unmatched waveforms.

FIGS. 22A and 22B are diagrams showing details of the FIG. 21 embodiment.

FIG. 25 is a block diagram of a gradient detecting circuit based on another example of gradients in brightness.

FIGS. 26A to 26D show still another embodiment according to the invention.

DESCRIPTION OF THE PREFERRED EMBODIMENTS

Figure 2:
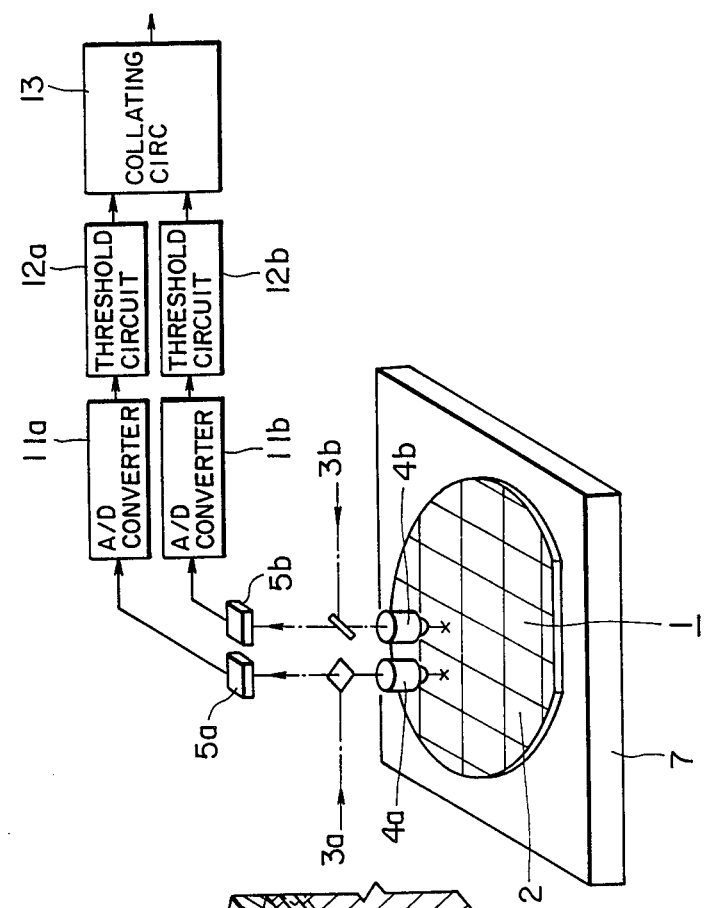
FIG. 2 is a diagram showing a prior art apparatus for checking the geometry of an LSI wafer.
Figure 1:
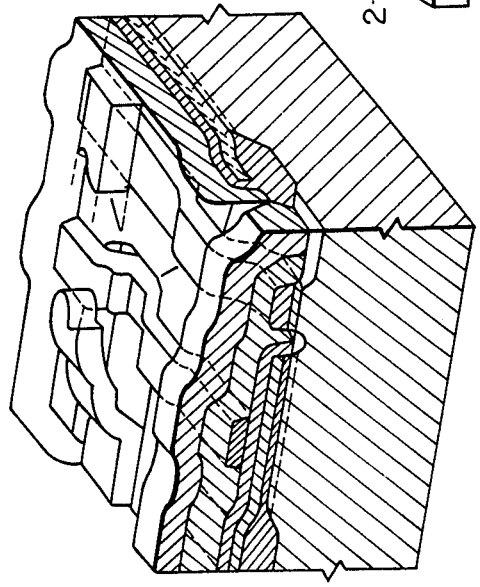
FIG. 1 is an enlarged perspective view showing details of a chip having a multi-layer pattern.
Figure 3A:
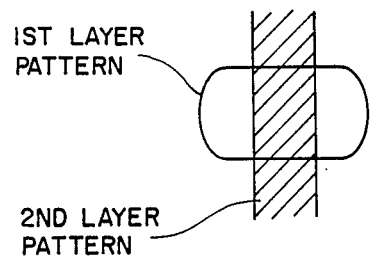
FIGS. 3A to 3C are diagrams illustrative of an example of unmatching between multi-layer patterns.
Figure 3B:
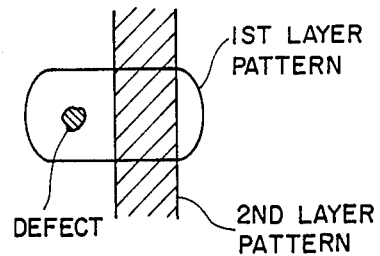
Figure 3C:
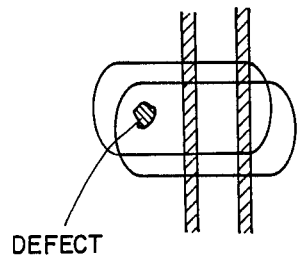

In order to eliminate inter-layer alignment errors, the following techniques are adopted.

When comparing two adjacent chips, two-layer patterns $f_2$ and $g_2$ on the two chips, either one having corresponding first and second layer patterns arranged in different level layers as shown in FIGS. 4A and 4B, are registered with each other with respect to either one of the first and second layer patterns and thereafter compared in brightness (of multi-level output signals from image sensors) to detect substantially matched portions and substantially unmatched portions. For example, when the corresponding first layer patterns are registered with each other, the corresponding second layer patterns are detected as unmatched portions as shown in FIG. 4C. Thus, FIG. 4C indicates that when the two-layer patterns $f_2$ and $g_2$ are registered with each other with respect to the first layer patterns thereon and compared, checking of the two chips has been completed with respect to the first layer patterns. Then, the substantially matched portion (hereafter simply referred to as matched portion), i.e., the entirety of the first layer pattern in this example, is removed out of the original pattern of FIG. 4A to be checked to reach a state as shown in FIG. 4D. The second layer patterns left behind as unremoved regions are subsequently registered with each other and the matched portion is removed to detect only a substantially unmatched portion (hereafter simply referred to as unmatched portion) as a defect as shown in FIG. 4F. In this manner, registration of the corresponding layer patterns constituting two of a plurality of multi-layer patterns and comparison of the layer patterns subject to the registration in brightness (amplitude of multi-level signals) for removal of the matched region are repeated serially by the number of layer patterns of the respective multi-layer patterns to permit the detection of only a defect.

FIGS. 5A and 5B show multi-layer patterns $f_3$ and $g_3$ on a wafer which are difficult to check because the inter-layer error is so large that a first layer pattern overlaps a second layer pattern. Based on the above method of checking the defect, these multi-layer patterns can be checked as will be described below.

As shown in FIG. 5C, the first layer patterns are registered with each other and a region matched in brightness, i.e., the first layer pattern is removed. It should be understood that while the first layer pattern of the multi-layer pattern $f_3$ to be checked is removed, the first layer pattern of the multi-layer pattern $g_3$ is intact for removal. However, in this case, simultaneously with the removal of the first layer pattern of the pattern $f_3$, there occurs an inconvenience that its second layer pattern is partly removed as shown in FIG. 5D, raising a problem that a portion of the second layer pattern now removed would be detected as an unmatched portion when the second layer patterns are registered with each other. To solve this problem, the region removed after the registration of the first layer patterns is recognized as a "Don't Care" region and masked. Accordingly, in the case of FIG. 5D, a processing is performed using, for example, a logical circuit to mask a portion other than a portion depicted by solid line. The resulting pattern (FIG. 5D) is registered with the multi-layer pattern $g_3$ to be checked (FIG. 5E) so as to check the remaining second layer pattern. This permits checking of the respective layer patterns on the respective multi-layer patterns even when the two layer patterns overlap, providing accurate size detection of a defect.

Defect judgement and "Don't Care" processing will be described with reference to FIGS. 6A to 6D and FIGS. 7A to 7D. Exemplified in FIGS. 6A and 6B are multi-level signal waveforms representative of the multi-layer patterns $f_3$ and $g_3$ for two semiconductor IC structures. These waveforms are registered as will be described later with reference to FIGS. 8A to 8F to provide a superimposed display as shown in FIG. 6C. A defective portion is darker than a normal portion. Therefore, assuming that the pattern $f_3$, for example, is removed when $f_3 - g_3 > -th$ where amplitudes of the signal waveforms representative of the patterns $f_3$ and $g_3$ are also designated by $f_3$ and $g_3$ and a threshold level is designated by $-th$, a waveform as shown in FIG. 6D is obtained from the FIG. 6C waveform. Hatched portions represent regions in which $f_3 - g_3 > -th$ is satisfied so that the patterns $f_3$ and $g_3$ are considered to be substantially matched with each other and the "Don't Care" processing is effected. For the judgement of matching between the patterns $f_3$ and $g_3$, the threshold level $-th$ is referenced. Another threshold level as defined by $f_3 - g_3 < +th'$ may otherwise be used solely or in combination with the $-th$ but the description herein will be dedicated to $f_3 - g_3 > -th$. FIG. 6D indicates that no defect exists in the first layer pattern. But, because of an inter-layer alignment error, the second layer patterns are matched incompletely and can not be removed.

Subsequently, a waveform of FIG. 7A (identical to the FIG. 6D waveform) and a waveform of FIG. 7B (identical to the FIG. 6B waveform) are registered with each other to provide a superimposed display as shown in FIG. 7C which indicates registration of the second layer patterns. Judgement based on $f_3 - g_3 > -th$ is again performed to obtain a waveform as shown in FIG. 7D containing only a defect to be determined. Hatched "Don't Care" regions do not participate in the registration and defect judgement. In this manner, checking of the patterns $f_3$ and $g_3$ has been completed.

As described above, the multi-layer patterns can be checked by effecting the defect judgement for each pattern layer in such a manner that the pattern layers are, so to speak, stripped off one by one, without being disturbed by the presence of inter-layer alignment errors.

For the registration set forth previously, a measure is employed as will be described with reference to FIGS. 8A to 8F. FIGS. 8A and 8D show the signal waveforms representative of the patterns $f_3$ and $g_3$. When these waveforms are applied with operators "1, $-2$, 1", dark edges (of low levels) alone can be detected to provide waveforms as shown in FIGS. 8B and 8E. These waveforms are referenced to a binary threshold level, th, so as to be converted with binary signal waveforms as shown in FIGS. 8C and 8F having "1" levels corresponding to edge portions of the patterns which are maximized in darkness and "0" levels corresponding to the remaining portions. Accordingly, these binary patterns representative of the edge patterns can be used for registration through pattern matching techniques. More specifically, on the assumption that the binary edge patterns are represented by fe and ge, a function $S(u, v)$ defined as below is introduced:

$$S(u, v) = \sum_{ij} [fe(i, j).EXOR\ ge(i - u, j - v)].$$

The function $S(u, v)$ is then measured so that the two patterns fe and ge are registered with each other by shifting the edge pattern ge relative to the edge pattern fe by amounts of $u$ and $v$ which minimize the function $S(u, v)$, thereby making it possible to detect misregistration between the original patterns $f_3$ and $g_3$ to be checked and consequently to detect matched portions and unmatched portions. In the definition of the above function, $(i, j)$ denotes coordinates of pixels in the patterns.

Figure 9:
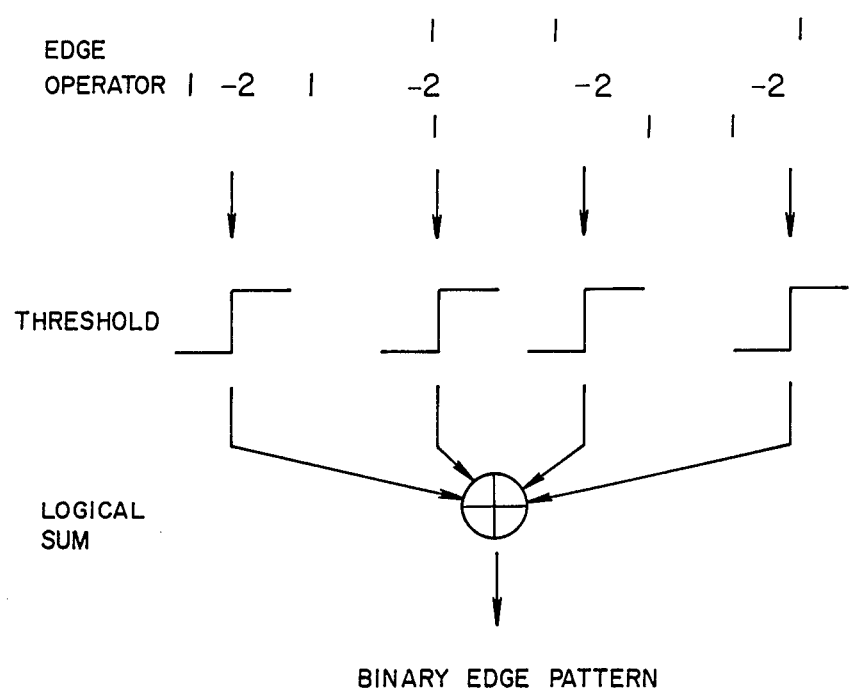

Essentially, the patterns $f_3$ and $g_3$ are represented by two-dimensional signal waveforms and hence a measure for checking edges in a two-dimensional pattern is diagrammatically illustrated in FIG. 9.

As a photoelectric converter for converting an optical image of the multi-layer pattern into an electric image signal, any types of converter such as a linear image sensor and a TV camera can be used. In one embodiment of the invention, two linear image sensors are used, whereby two-dimensional patterns on an LSI wafer are detected by utilizing self-scanning of the linear image sensors in their longitudinal direction and movement of an XY table in a direction orthogonal to the self-scanning direction.

Figure 10:
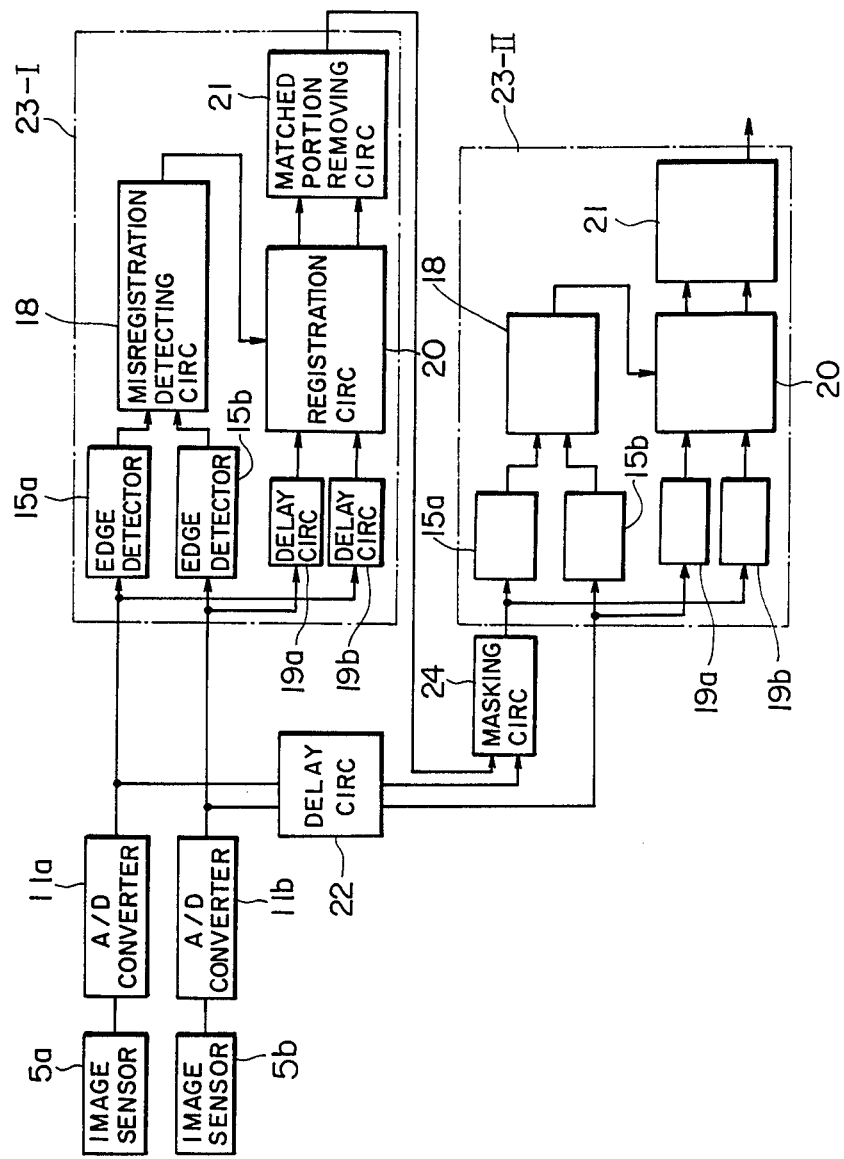
FIG. 10 is a block diagram of an embodiment according to the invention.

FIG. 10 is a block diagram of an apparatus for checking the geometry of wafer patterns. Output signals (FIGS. 8A and 8D) produced from linear image sensors $5a$ and $5b$ are converted into multi-level (more than binary) digital signals by A/D converters $11a$ and $11b$ and for detection of pattern edges, applied with operators, for example, "1, $-2$ and 1" by edge detectors $15a$ and $15b$ (FIGS. 8B and 8E). A misregistration detecting circuit 18 converts output signals of the edge detectors $15a$ and $15b$ into binary signals (FIGS. 8C and 8F), shifts one of the binary patterns (fe in FIG. 8C or ge in FIG. 8F), counts at a shifted position a number of pixels contained in an unmatched portion between the two binary patterns to detect an amount of misregistration therebetween, and finally produces two output signals representative of movements in the orthogonal directions and corresponding to two count values with which the number of unmatched pixels (image elements) is minimum. The multi-level digital output signals, produced from the linear image sensors $5a$ and $5b$ and converted at the A/D converters $11a$ and $11b$, and also fed to delay circuits $19a$ and $19b$ at which they are delayed for a time period determined by the number M (for example, 1024) of elements of the linear image sensor and the frequency N (for example, 256) of self-scanning of the image sensor required for registration. Thus, each of the delay circuits $19a$ and $19b$ is constituted with a shift register of $M \times N$ bits. A registration circuit 20 shifts output signals of the delay circuits $19a$ and 19b such that an optimum registration state with a minimal amount of misregistration which is determined by the outputs of the misregistration detecting circuit 18 can be established, thereby accomplishing registration (FIG. 6C). The edge detectors 15a, 15b, misregistration detecting circuit 18, delay circuits 19a 19b and registration circuit 20 constitute registering means (corresponding to block 30 in FIG. 21 and block 60 or 70 in FIG. 26A). A matched portion removing circuit 21 (constituting comparing means) then compares, in brightness (optical darkness), output signals (digital signals having a multi-level, more than two levels) of the registration circuit 20 and removes a substantially matched region (FIG. 6D). An unmatching detecting circuit 23-I provided for one layer pattern has the construction as described above. A plurality of unmatching detecting circuits each having a similar construction are connected in series with the circuit 23-I, so that the unmatching detecting circuits, amount in total to the number of layer patterns. The arrangement of FIG. 10 is specifically adapted for multi-layer patterns each having two layer patterns and constituted with a delay circuit 22, a masking circuit 24 and a pair of pattern unmatching detecting circuits 23-I and 23-II. The masking circuit 24 interconnects the unmatching detecting circuits 23-I and 23-II, and has one input connected to the output of the matched portion removing circuit 21 of the circuit 23-I and the other input connected to one output of the delay circuit 22. The delay circuit 22 is connected to receive the output signals of the A/D converters 11a and 11b and applies one delayed output signal to the masking circuit 24 as mentioned above and the other delayed output signal to the edge detector 15b and delay circuit 19a of the circuit 23-II. The masking circuit 24 produces an output signal applied to the edge detector 15a and delay circuit 19b of the circuit 23-II.

Referring to FIG. 11A, there is shown an arrangement used as the edge detector 15a or 15b of FIG. 10. A three-stage shift register 150 adapted to receive a digital image signal of 8 bits, for example, sent from the A/D converter 11a or 11b has the first stage whose output signal is supplied to an adder 151 and the second stage whose output signal is supplied to an amplifier 152 having a gain of two. Output signals from the adder 151 and amplifier 152 are supplied to a substracter 153 whose output difference signal is converted into a binary signal by a threshold circuit 154 and supplied as an edge detection signal to the misregistration detecting circuit 18. The shift register 150, adder 151, amplifier 152 and subtracter 153 cooperate as an edge operator for forming operators 1, −2 and 1.

A modified edge detector as shown in FIG. 11B is adapted for the arrangement of FIG. 9. In order to detect edges in 8 directions lying longitudinally, laterally and obliquely, the output signal from the A/D converter 11a or 11b is applied to a 3×3 image element selecting circuit 24 and requisite edge operations are effected with four edge operators OP1 to OP4. Each of the operators OP1 to OP4 is identical to the operator shown in FIG. 11A. Output signals of the operators OP1 to OP4 are converted into binary signals by thresoold circuits 154-1 to 154-4 and are all supplied to a logical sum circuit 25. An output signal from the circuit 25 is fed to shift registers 180a and 181a or a shift register 182 of the misregistration detecting circuit 18 as detailed in FIG. 12.

Figure 12:
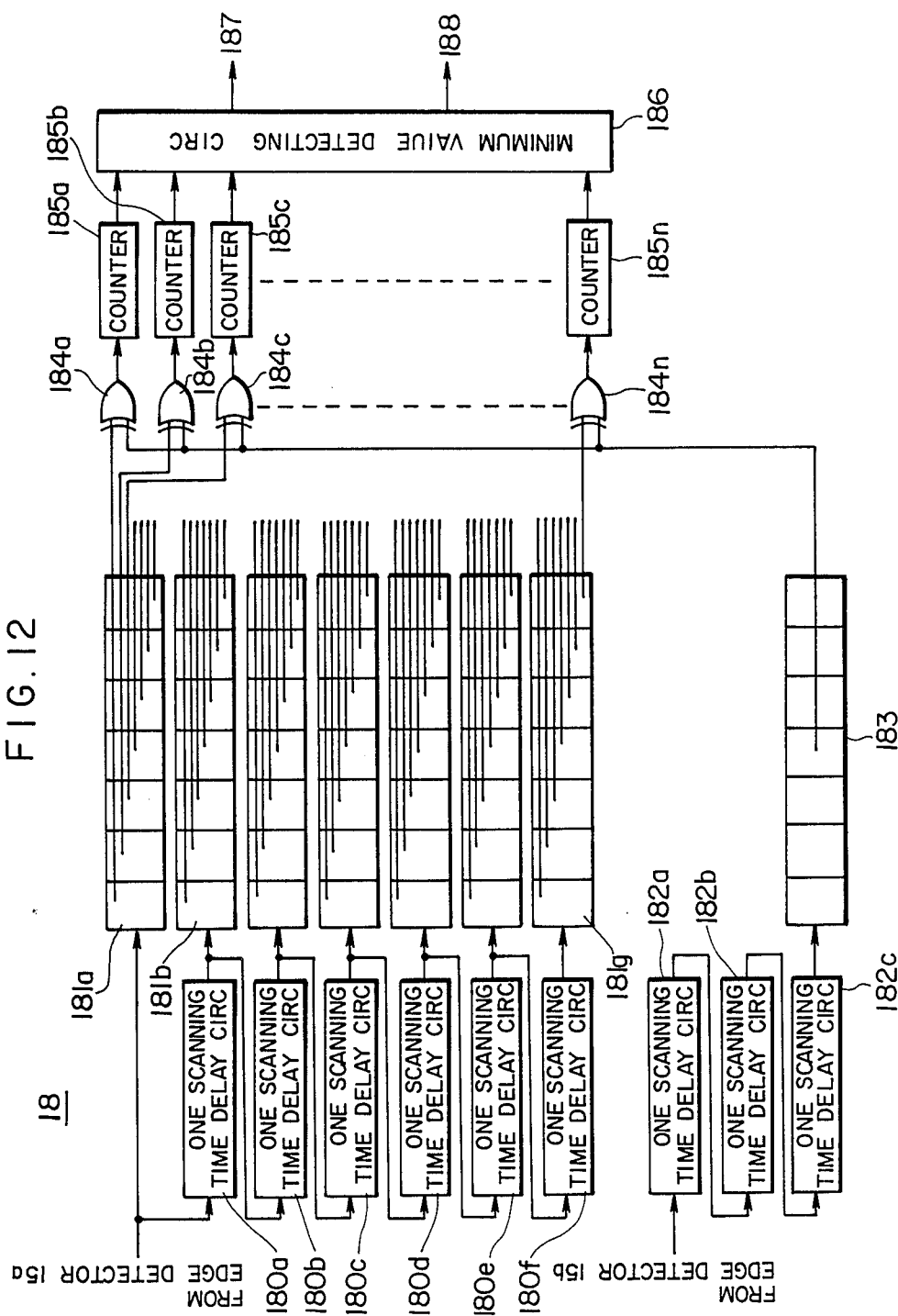
FIG. 12 is a block diagram showing an example of a misregistration detecting circuit which may be used in the embodiment of the invention.

The misregistration detecting circuit 18 of FIG. 10 is exemplarily configured as illustrated in FIG. 12. In this arrangement, shift registers 180a to 180f serve as one scanning time delay circuits each of which delays the A/D converted output of the linear image sensor 5a by one scanning time, and a two-dimensional local memory for 7×7 pixels (alternatively, 9×9 pixels) consists of serial-in/parallel-output shift registers 181a to 181g. The one scanning time delay circuits and the local memory cooperate to select 7×7 pixels from the output signal (FIG. 8C) delivered out of one threshold circuit 154. Similar shift registeres 182a to 182c and 183 delay the output signal (FIG. 8F) of the other threshold circuit 154 to produce a delayed output signal which is synchronized with the center position of the local memory.

The output signal of the shift register 183 and respective bit output signals are exclusive ORed by exclusive OR circuits 184a to 184n to detect unmatched pixels. Counters 185a to 185n count the number of unmatched pixels. These counters 185a to 185n and cleared to zero each time that the linear image sensor has completed N cycles of scanning. Therefore, by reading out the content of the counter immediately before clearing the counter, the number of unmatched pixels within an area of (M pixels)×(N scanning lines) can be found. Since the respective bit output signals of the local memory are obtained when the image signal is shifted pixel by pixel within ±3 pixels with respect to the output signal of the shift register 183 in XY directions (two orthogonal directions), the counters 185a to 185n count the number of unmatched pixels obtained when the input pattern is shifted by an amount within ±3 pixels in the XY directions. Accordingly, it is possible to detect amounts of shifting in the XY directions which make the number of unmatched pixels minimal by examining which counter has a minimum value and consequently to ensure registration optimized for respective layer patterns.

A minimum value detecting circuit 186 (for example, comprised of a comparator) reads values of the counters 185a to 185n to select a counter having the minimum value, and produces an output signal 188 representative of an amount of shifting in the linear image sensor scanning direction (Y direction) and an output signal 187 representative of an amount of shifting in the orthogonal direction (X direction).

The registration circuit 20 of FIG. 10 is exemplarily configured as shown in FIG. 13. A selecting circuit 201 is responsive to the shift amount signal 187 to select an optimum shift position from the output signal of the delay circuit 19a and from output signals of shift registers 200a to 200f serving as one scanning time delay circuits, and applies the optimum shift position to a shift register 202. A selecting circuit 203 is responsive to the shift amount signal 188 to select an optimum shift position in the scanning direction. Accordingly, the selecting circuit 203 extracts a pixel of the local memory at the optimum shift position where the amount of unmatching is minimized. On the other hand, shift registers 204a to 204c serving as one scanning time delay circuits and a shift register 205 cooperate to extract from the output signal of the delay circuit 19b a pixel of the local memory of a position which is delayed by the same amount as the output signal of the shift register 183 shown in FIG. 12. An output signal 206 representative the pixel of the local memory delivered out of the selecting circuit 203 under this condition takes the optimum shift position where it is registered with an output signal 207 representative of the pixel of the local memory delivered out of the shift register 205 (FIGS. 6C and 7C).

Figure 14A:
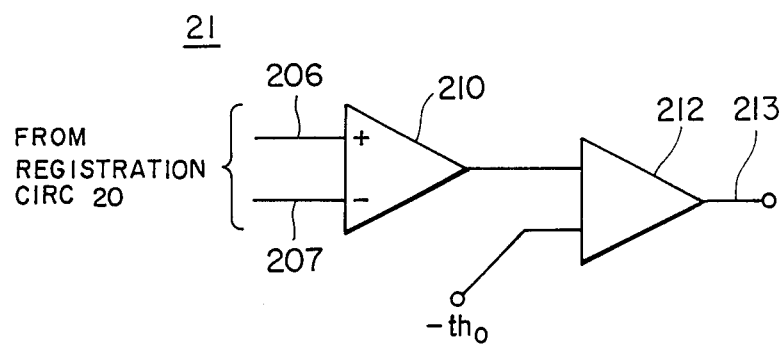
FIG. 14A is a block diagram showing an example of a matched portion removing circuit usable in the embodiment of the invention.

The matched portion removing circuit 21 converts the difference between the output signals of the registration circuit 20 into a binary signal and is exemplarily configured as shown in FIG. 14A. A signal 211, E(f$_3$)−E(g$_3$), representative of the difference between the registered patterns f$_3$ and g$_3$ produced from a subtracter 210 is referenced to a threshold level −th$_0$ at a threshold circuit 212 so as to be converted into a binary signal. When the difference signal exceeds the threshold level −th$_0$, indicating that the patterns f$_3$ and g$_3$ are substantially registered with each other and no defect exists, a "Don't Care" signal 213 is produced from the threshold circuit 212 (FIG. 6D). This circuit permits judgement of defect even when the pattern to be checked has less contrast. The subtracter 210 may be constituted with, for example, a 4-bit full adder of type SN 74LS 83 or SN 74LS 283, and the threshold circuit 212 may be constituted with, for example, an 8-bit comparator of any of types SN 74LS 682 to SN 74LS 685.

Figure 14B:
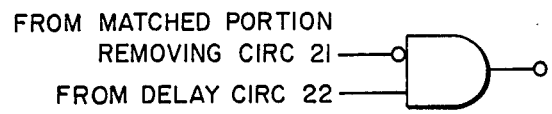
FIG. 14B is a diagram showing a masking circuit usable in the embodiment of the invention.

The masking circuit 24 of FIG. 10 is responsive to the output signal of the matched portion removing circuit 21 to effect "Don't Care" processing by masking matched portions as shown in FIG. 6D. The unmatching detecting circuit 23-II (FIG. 10) for one layer pattern never uses the masked region. Exemplarily, the masking circuit 24 is configured as shown in FIG. 14B, including an AND circuit having an inverting input for receiving the output signal from the circuit 21 and a non-inverting input for receiving the output signal from the circuit 22.

An example of the pattern geometry checking circuit for checking the multi-layer patterns has been described by way of two-layer patterns but more than two of layer patterns may be checked similarly by connecting in pipeline the same number of unmatching detecting circuits as the layer patterns.

As has been described, the present invention is effective to check the geometry of patterns of less contrast and specifically, can afford to detect a defect even when an inter-layer alignment error exists between two patterns to be compared.

Figure 16A:
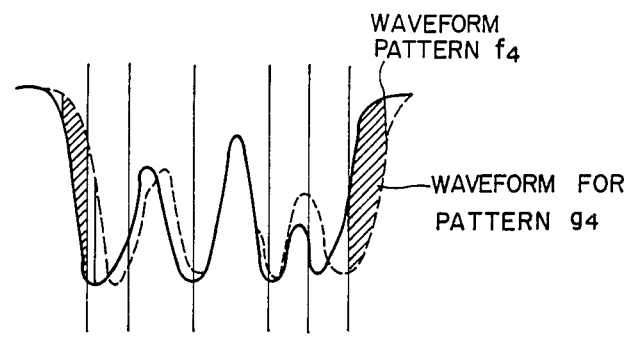
FIGS. 16A to 16C and FIGS. 17A to 17C are diagrams showing unmatched waveforms and gradients in brightness after completion of registration.
Figure 16B:
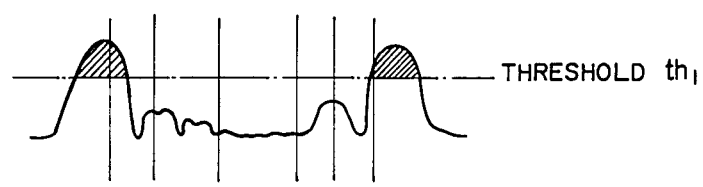
Figure 16C:
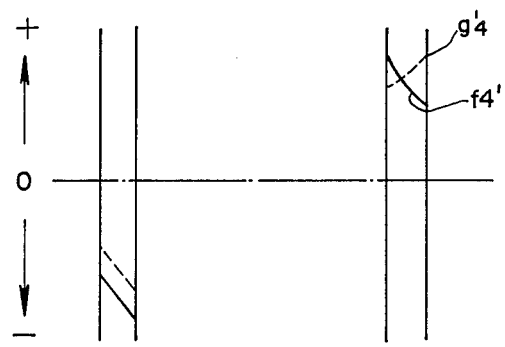

Incidentally, in checking the geometry of the multi-layer patterns, the inter-layer alignment error or the fine unevenness of patterns must be recognized as a defect and detected when it exceeds a reference value but must be considered to be normal and allowed when it does not exceed the reference value. When taking the above into consideration, multi-layer patterns on two adjacent chips are compared for checking the geometry thereof as will be described below. With reference to FIGS. 15A to 15C, corresponding multi-layer patterns f$_4$ and g$_4$ on the two chips are registered with each other and thereafter, in respect of analog electric signals or multi-level (more than tertiary) digital electric signals representative of the patterns f$_4$ and g$_4$, the difference in brightness between the patterns f$_4$ and g$_4$ is detected. In case where the inter-layer alignment error is small (FIGS. 16A to 16C), even for portions at which the absolute value of the difference in brightness, |E(f$_4$)−E(g$_4$)|, exceeds a threshold level th$_l$, the gradients f$_4$' and g$_4$' in brightness of the original patterns f$_4$ and g$_4$ tend to be substantially identical to each other or to be less different (FIG. 16C). However, in case where the inter-layer alignment error is large (17A to 17C), the gradients f$_5$' and g$_5$' in brightness of the patterns f$_5$ and g$_5$ greatly differ from each other.

Where there exists a defect, for example, an isolated defect in the pattern f$_4$, for regions at which |E(f$_4$)−E(g$_4$)|≧th$_l$ stands for the difference in brightness, the gradients in brightness of the two patterns f$_4$ and g$_4$ differ from each other.

Accordingly, even when there exist inter-layer alignment errors or fine unevenness in the pattern which lead to misregistration, unmatching due to a defect which is smaller than an amount of relatively large unmatching due to that misregistration can be detected by registering the multi-layer patterns on the two chip, thereafter detecting, as defect candidates, regions having amounts of unmatching which, when referenced to a predetermined threshold level, exceed the threshold level, and finally comparing the profiles (for example, gradients) of waveforms representing brightness of the defect candidates to judge the difference in magnitude of gradients in brightness between the defect candidates.

For example, when patterns f$_6$ and g$_6$ as shown in FIGS. 18A and 18B are registered with each other, there occur due to the inter-layer alignment error (underlying patterns are not illustrated) instances of incomplete registration such as (a) misregistration by one pixel (FIG. 18C), (b) misregistration by two pixels (FIG. 18D) and (c) misregistration by three pixels (FIG. 18E). In these instances, a 3×3 (pixel) window is applied to regions having large amounts of unmatching. Practically, the window is a two-dimensional one but for simplicity of explanation, a one-dimensional window will be used in the following description. A defect having a 3×3 size of unmatching is detected using the window. In the case of FIG. 18C, the amount of unmatching between the patterns is small and there occurs no problem. In the case of FIG. 18D, the amount of unmatching between pixels as indicated is large and these regions are recognized as defect candidates. Thus, the 3×3 window is applied to these defect candidates to detect the difference in gradients in brightness of the two patterns within the window. In this case, it follows that the gradients substantially coincide with each other and a small amount of local misregistration is indicated. In the case of FIG. 18E, the amount of unmatching between pixels as indicated is large and these regions are also recognized as defect candidates. Thus, the gradients within the 3×3 window slightly differ from each other, indicating that the amount of misregistration is larger than that of the case of FIG. 18D. Dependent upon the difference in gradient, these defect candidates may be recognized as constituting a defect or a normal portion.

Where the widths of edges very, the amount of unmatching between pixels of patterns f$_7$ and g$_7$ as indicated becomes large as shown in FIGS. 19A to 19C. However, since the gradients are identical to each other within the 3×3 window and the misregistration in this case is recognized as allowable misregistration.

Where such a defect as disconnection exists, the difference in gradients within the 3×3 window becomes large between pixels of patterns f$_8$ and g$_8$ for which the amount of unmatching is large. Consequently, the pattern f$_8$ having the disconnection can be recognized as a defective pattern.

In this manner, with the 3×3 window, a defect of a three-pixel size can be detected while recognizing the misregistration extending to two or three pixels as being allowable. In other words, any misregistration of two pixels has conventionally been detected as a defect due to unmatching amounting to more than three pixels but according to the above method of the invention, an original defect due to unmatching amounting to more than three pixels can be detected.

As previously described, any type of photoelectric converter such as the linear image sensor or the TV camera may be used but the following embodiments will be described using the linear image sensor.

Figure 21:
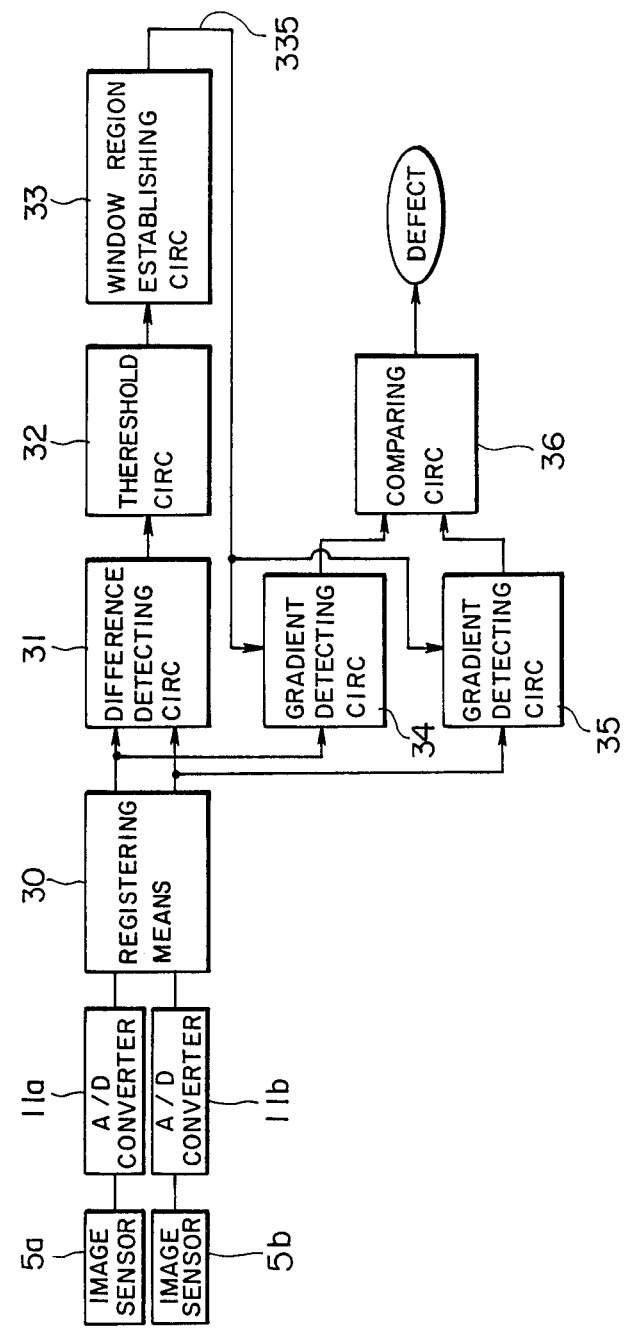
FIG. 21 is a block diagram of another embodiment according to the invention.

FIG. 21 shows another embodiment of the apparatus for checking the geometry of multi-layer patterns. Output signals produced from linear image sensors 5a and 5b are converted by A/D converters 11a and 11b into multi-level (more than tertiary) digital signals, and registration is effected by a registering means 30. Registered digital signals 300 and 301 are supplied to a difference detecting circuit 31 which detects the absolute value in difference between the signals 300 and 301. A difference signal is converted into a binary signal by a threshold circuit 32 and defect candidates are detected thereby. A 3×3 window region establishing circuit 33 removes, from the defect candidates thus detected, defect candidates of less than three pixels. An output signal 335 is produced from the window region establishing circuit 33 when the amount of unmatching between the signals 300 and 301 is so large that exceeds three pixels. Subsequently, with respect to the thus produced defect candidates, gradients within the window are determined from the signals 300 and 301 by gradient detecting circuits 34 and 35. The thus obtained gradients are compared with each other by a comparing circuit 36. A large difference in gradient is detected as a defect. The gradient detecting circuits 34 and 35 and comparing circuit 36 constitute detect defection signal producing means.

Figure 17A:
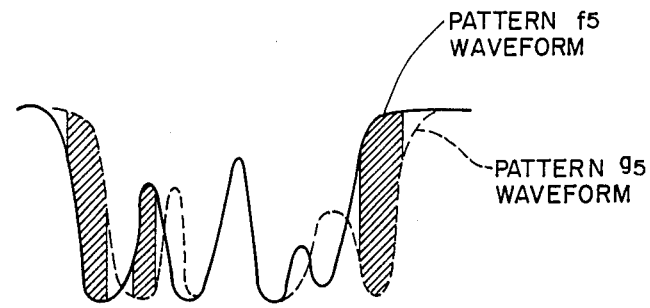
Figure 17B:
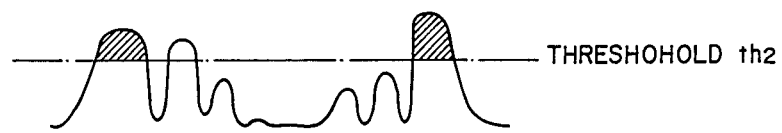
Figure 17C:
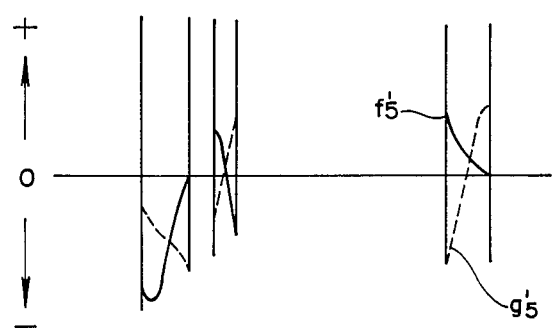
Figure 22A:
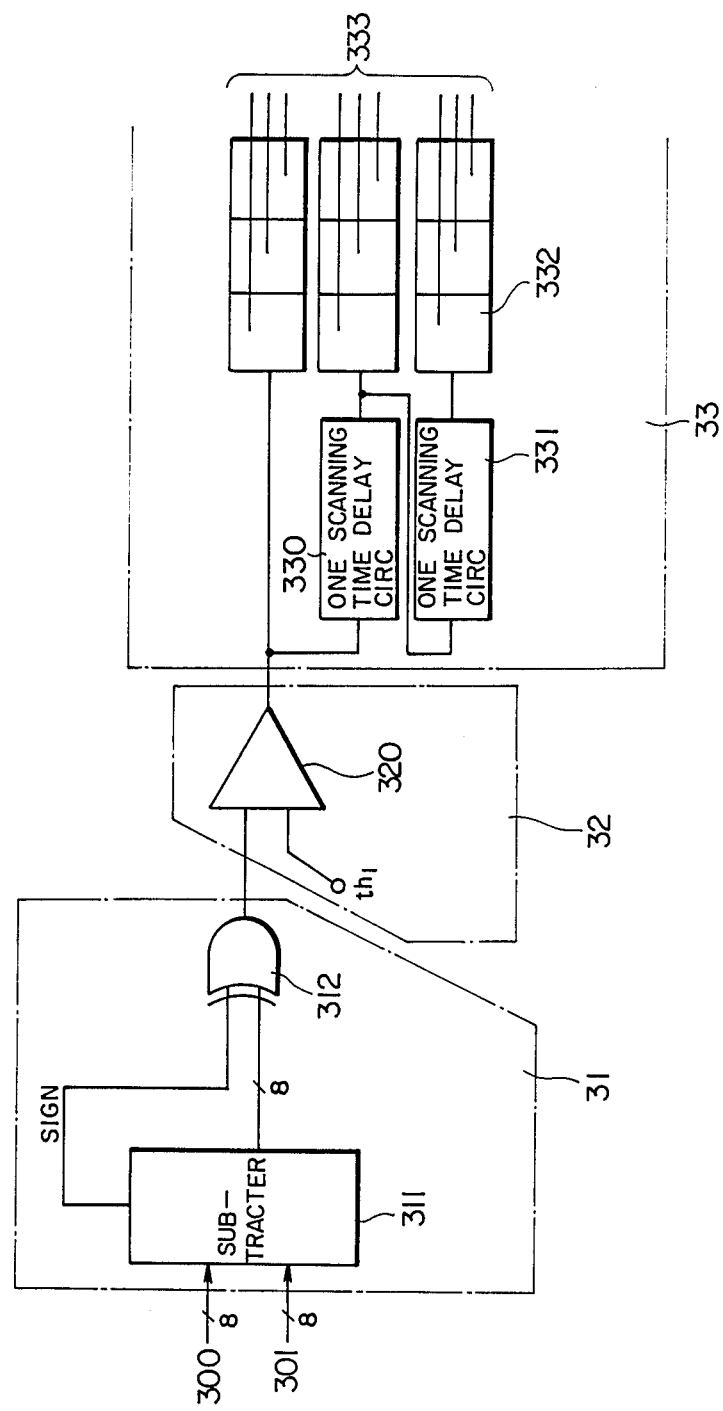

The components of the FIG. 21 apparatus will exemplarily be constructed as below. The registering means 30 may be constituted with the edge detectors 15a and 15b, misregistration detecting circuit 18, delay circuits 19a and 19b and registration circuit 20. Referring to FIGS. 22A and 22B, the multi-level digital signals 300 and 301 (8 bits, in this example) which are locally misregistered but registered in average are inputted to a subtracter 311 (FIG. 22A), and the absolute value of difference between the signals 300 and 301 is detected by an exclusive OR circuit 312. The difference absolute value is referenced to a threshold level $th_1$ at a comparator 320 so as to be converted into a binary signal (FIGS. 16B and 17B). Shift registers 330 and 331 each serve as one scanning time delay circuits, and serial-in/parallel-out shift registeres 332 constitute a 3×3 pixel selecting circuit. The one scanning time delay circuits and the 3×3 pixel selecting circuit cooperate to produce, from an output signal of the comparator 320, output signals 333 which enable an AND circuit 334 (FIG. 22B) to deliver out an output signal 335 when the level of brightness of any pixels within the 3×3 window exceeds the threshold $th_1$ but otherwise disable the AND circuit. Then, a 3×3 pixel selecting circuit comprised of shift registers 340 and 341 and a serial-in/parallel-out shift register 342 as shown in FIG. 22B is responsive to the output signal 335 of the AND circuit to select 3×3 pixels from the signals 300 and 301. When the absolute value of difference between the signals 300 and 301 exceeds the threshold level $th_1$ over 3×3 pixels, the AND circuit 334 is enabled to provide the output signal 335 which in turn makes the 3×3 pixel selecting circuit valid. Signals representative of brightness are produced from the 3×3 pixel selecting circuit and inputted to subtracters 343 for detection of gradients in brightness. Of the detected gradients, those corresponding to the signals 300 and 301 are compared by the comparing circuit 36, and a large difference in gradient is detected as a defect. The comparing circuit 36 comprises a subtracter and a comparator.

Figures 23A, 23B, 24:
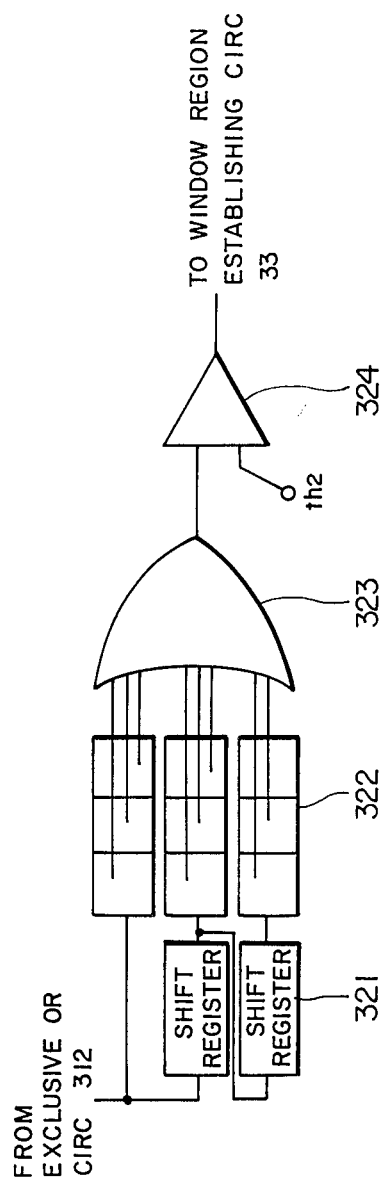
FIGS. 23A and 23B are diagrams showing an example of gradients in brightness.
FIG. 24 is a block diagram showing an example of a threshold circuit for determining defect candidates.

The gradients are exemplified in FIGS. 23A and 23B. When the 3×3 pixel selecting circuit provide pixels A, B, C . . . as shown in FIG. 23A, a gradient comparison table as shown in FIG. 23B can be prepared. If, upon comparison of values in the gradient comparison table, at least one large difference is found between values for the signals 300 and 301, then the large difference value will be recognized as representing a defect.

In the foregoing embodiment, the absolute value of difference between the two signals 300 and 301 is converted by the threshold circuit 32 into the binary signal but as shown in FIG. 24, shift registers 321, a 3×3 pixel selecting circuit comprised of a serial-in/parallel-out shift register 322 and an adder 323 may cooperate to produce, from the absolute value of difference between the signals 300 and 301, a sum of levels of brightness of 3×3 pixels which in turn is referenced to a threshold level $th_2$ at a comparator 324 so as to be converted into a binary signal.

The gradient detecting circuits 34 and 35 are exemplarily configured as shown in FIG. 25. In this arrangement, gradients in brightness of 3×3 pixels are compared within a region which is defined by enlarging the 3×3 pixel window by two surrounding pixels. In FIG. 25, gradients in brightness are compared within, for example, a hatched region but practically, within a region of 7×7 pixels, a region is searched for in which gradients in brightness are most close to each other so that local registration is established. Such gradients are compared to judge the presence of a defect. Reference numerals 351 and 354 designate shift registers, and the remaining components are identical to those of FIG. 22B.

In a particular case of FIG. 25, the windows 351 and 354 may have 1×1 pixels and 3×3 pixels, respectively, and a region is searched for in which gradients in brightness of pixels in the window 351 is close to gradients in brightness of 3×3 pixels in the window 354 so that local registration is established. Such gradients are compared to judge the presence of a defect. In this case, the gradients in brightness defined in the 3×3 pixel window is modified to that defined in the 1×1 pixel window. In other words, the invention can be applied to the comparison of gradients in brightness within the 1×1 window when a defect to be checked is small.

According to the arrangements of FIGS. 24 and 25, wafers having various kinds of pattern edges can be checked, thereby improving accuracies of defect detection.

Especially, the embodiment of FIG. 21 can afford to detect a defect from the patterns to be checked having less contrast. In particular, only defects can be detected regardless of the inter-layer alignment error, the fine unevenness in patterns and the small dimensional difference in the edge width, thus materializing highly automated method and apparatus for checking patterns.

Reference will now be made to FIGS. 26A to 26D, showing an apparatus for checking the geometry of wafer patterns according to another embodiment of the present invention.

As a photoelectric converter for converting an optical image of the multi-layer pattern into an electric image signal, any types of converter such as a linear image sensor and a TV camera can be used. In this embodiment of the invention, a linear image sensors is used, whereby two-dimensional pattern on an LSI wafer are detected by utilizing self-scanning of the linear image sensors in their longitudinal direction and movement of an XY table in a direction orthogonal to the self-scanning direction.

The output of the inner image sensor 5 is converted to a multi-level digital signal (the number of levels being more than two) by an A/D converter 11 and is then fed to an edge detector 15a. The output of the converter 11 is also fed to an image memory 14 to store therein pattern information so that another edge detector 15b is fed with a digital image signal read out from the memory 14. The digital image signal fed to the edge detector 15b corresponds to a layer pattern of a chip near the chip a layer pattern of which corresponds to the digital image signal fed to the edge detector 15a. Use of the image memory 14 makes it possible with a single image sensor to compare corresponding two layer patterns of two chips near each other on a wafer. The edge detectors 15a and 15b which may have a structure similar to detectors 15a and 15b shown in FIG. 10 detect edges of layer patterns. A misregistration detecting circuit 18 which may have a structure similar to circuit 18 shown in FIG. 10 shifts the outputs of the edge detectors 15a and 15b which are binary coded pattern signals and count unmatched pixels or image elements to detect the amount of misregistration between the two pattern signals at each shifted position and finally produces two output signals representative of movements in the othogonal directions and corresponding to two count values with which the number of unmatched pixels (image elements) is minimum. The outputs of the A/D converter 11 and the image memory 14 are also fed to delay circuits 19a and 19b, respectively, in which they are delayed for a time period determined by the number M (for example, 1024) of elements of the linear image sensor and the frequency N (for example, 256) of self-scanning of the image sensor required for registration. Thus, each of the delay circuits 19a and 19b is constituted with a shift register of M×N bits. A registration circuit 20 which may have a structure similar to circuit 20 shown in FIG. 10 shifts output signals of the delay circuits 19a and 19b such that an optimum registration state with a minimal amount of misregistration which is determined by the outputs of the misregistration detecting circuit 18 can be established, thereby accomplishing registration. A matched portion removing circuit 51 then compares, in brightness (optical darkness), output signals 300 and 301 (digital signals having a multi-level, more than two levels) of the registration circuit 20, removes a substantially matched region and further produces a dark detect candidate signal 302 representative of a portion of the image pattern signal from the converter 11 via the delay circuit 19a "darker" than the output of the image memory 14 via the delay circuit 19b and a bright detect candidate signal 303 representative of a portion of the image pattern signal from the converter 11 via the delay circuit 19a "brighter" than the output of the image memory 14 via the delay circuit 19b. The outputs 300 and 301 of the registration circuit 20 are also fed to a gradient detecting and comparing circuit 54.

Figure 26B:
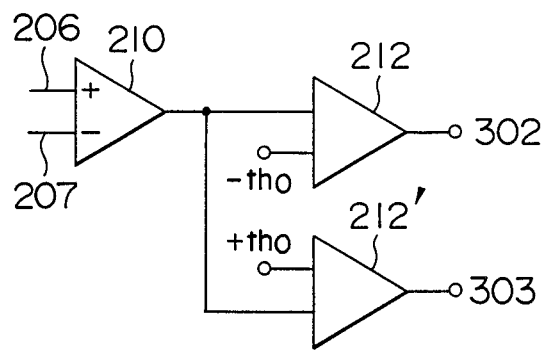

An example of the matched portion removing circuit 51 is shown in FIG. 26B, in which members similar to those shown in FIG. 14A are designated by the same reference numerals. The output of the subtractor 210 is fed to a second threshold circuit 212' with a threshold +th$_0$ as well as to the threshold circuit 212 so that the above-mentioned candidate signals 302 and 303 are delivered from the circuits 212 and 212', respectively.

The outputs of the matched portion removing circuit 51, which carry information on matched and unmatched portions of the image pattern signals, are then fed along with the outputs 300 and 301 of the registration circuit 20 to the gradient detecting and comparing circuit 54 in which the unmatched portions are further discriminated to determine whether the unmatched portions constitute substantial defects or not. The gradient detecting and comparing circuit 54 may have a structure similar to a combination of structures of the gradient detecting circuits 34 and 35 and the comparing circuit 36 shown in FIG. 21.

The outputs of the matched portion removing circuit 51 is also fed to the misregistration detecting circuit 18 and the matched portion removing circuit 53 via delay circuits 521 and 522 of the delay means 52 for the succeeding stage.

That is, since the misregistration detecting circuit 18 in block 70 in the succeeding stage need not deal with those portions of the patterns which have already been detected as matched portions in the circuit 51, the exclusive OR outputs with respect to the binary signals supplied from the edge detectors 15a and 15b are "masked" by the output 302 of the circuit 51 in the first stage.

FIG. 26C shows an example of the circuit structure for the masking. In FIG. 26C, members similar to those shown in FIGS. 26B and 12 are designated by the same reference numerals. The output 302 of the matched portion removing circuit 51 is delayed at the delay circuits 571 to 572 for a time period identical with that which is effected by the delay circuits 182a to 182c and is fed to the inverted input terminal of each of the AND circuits 574a to 574n. The other, non-inverted input terminals of the AND circuits 574a to 574n are fed with the outputs of the exclusive OR circuits 184a to 184n, respectively. The outputs of the AND circuits 574a - 574n are fed to the counters 185a to 185n such as shown in FIG. 12.

As for the matched portion removing circuit 53 in the succeeding or second stage, it need not deal with those portions of patterns which have already been detected as matched portions in the circuit 51, the outputs of the matched portion removing circuit 53 are "masked" by the outputs 302 and 303 of the matched portion removing circuit 51.

Figure 26D:
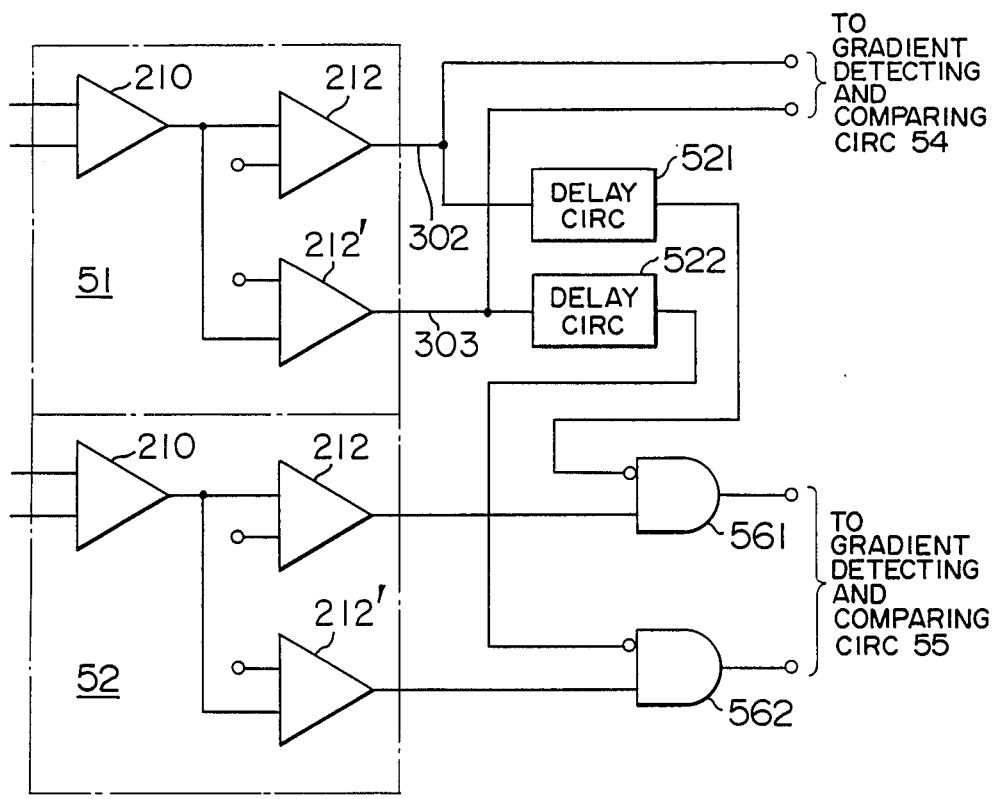

FIG. 26D shows an example of the circuit structure for the masking. In FIG. 26D, members similar to those shown in FIGS. 26A and 26B are designated by the same reference numerals. The outputs 302 and 303 of the circuit 51 are fed via delay circuits 521 and 522 to the inverted input terminals of the AND circuits 561 and 562, respectively while the other, non-inverted input terminals of the AND circuits 561 and 562 are fed with the outputs of the output signals of the matched portion removing circuit 52, respectively. The delay circuits 521 and 522 are identical with the delay circuits 19a and 19b, i.e., the delay time periods by the circuits 521 and 522 are the same as those by the circuits 19a and 19b.

An unmatching detecting circuit for one layer pattern has the construction as described above. A plurality of unmatching detecting circuits each having a similar construction are connected in series so that the unmatching detecting circuits amount in total to the number of layer patterns. And, the output of the gradient detecting and comparing circuit in the final stage delivers a detection output which should be taken as being representative of a defect or defects in a practical sense. The embodiment shown in FIG. 26A are for a multilayer pattern including two layer patterns, so that only two stages are shown. Therefore, when single layer patterns or multi-layer patterns including two pattern layers without no interlayer alignment error are to be checked, the output of the gradient detecting and comparing circuit 54 in the first stage is effective or valid.

We claim:

1. A method of checking the geometry of multi-layer patterns wherein images of corresponding portions on two of a plurality of identical circuit patterns on a specimen are detected to produce detection signals indicative of the corresponding portions in levels in terms of brightness of the detection signals, and the detection signals are compared with each other to judge an unmatched portion as a defect, said method comprising the steps of:
   (a) registering the two detection signals;
   (b) comparing levels of brightness of the two detection signals to judge that a portion of the detection signal at which the difference in brightness is less than a threshold level is normal and to define the normal portion as a "Don't Care" portion;
   (c) masking the detection signal at the "Don't Care" portion to inhibit the use of the "Don't Care" portion for the following registration and defect judgement;
   (d) sequentially repeating said steps (a) to (c) for each layer of said multi-layer pattern to detect a region finally screened out of said "Don't Care" portion as a defect.

2. An apparatus for checking the geometry of multi-layer patterns wherein images of corresponding portions on two of a plurality of identical circuit patterns on a specimen are detected to produce detection signals indicative of the corresponding portions in levels in terms of brightness of the detection signals, and the detection signals are compared with each other to judge an unmatched portion as a defect, said apparatus comprising a plurality of defect detecting circuits connected in series by the same number as layers in said multi-layer pattern, each defect detecting circuit including:
   means for registering the two detection signals;
   means for comparing levels of brightness of the two detection signals to judge that a portion of the detection signal at which the difference in brightness is less than a threshold level is normal and to define the normal portion as a "Don't Care" portion; and
   means for masking the detection signal at the "Don't Care" portion.

3. An apparatus for checking the geometry of patterns comprising:
   two photoelectric converters receiving images of two patterns on an object to be checked and producing two detection signals used for comparing the images with each other;
   registering means for correcting misregistration between the two detection signals on the basis of differences therebetween;
   a difference image threshold circuit for converting differences between the two corrected detection signals into binary signals and producing the binary signals as defect candidates;
   window region establishing circuit for applying a window on the defect candidates;
   two gradient detecting circuits for detecting gradients of the corrected detection signals within the window; and
   a comparing circuit for comparing the two gradients to produce an output signal when the difference between the two gradients exceeds a predetermined value.

4. An apparatus according to claim 3 wherein said photoelectric converter comprises a linear image sensor.

5. An apparatus according to claim 3 wherein said difference image threshold circuit comprises a subtracter for receiving said two corrected detection signal, an exclusive OR element for exclusive ORing an output signal of the subtracter and a sign signal, and a comparator for comparing an output signal of the exclusive OR circuit with a predetermined threshold level.

6. An apparatus according to claim 3 wherein said window region establishing circuit comprises shift registers for delaying an output signal of said difference image threshold circuit by one scanning time of said photoelectric converter, a serial/parallel conversion register for receiving the output signal of said different image threshold circuit directly or through said shift registers, and an AND element for receiving output signals of the serial/parallel conversion register.

7. An apparatus according to claim 3 wherein said window region establishing circuit has a window of a size between 2×2 pixels and n×n pixels (n: natural number being not less than 3) which are practically determined by the processing speed.

8. An apparatus according to claim 3 wherein said gradient detecting circuit has a window of a size between 3×3 pixels and n×n pixels (n: natural number being more than 3).

9. An apparatus according to claim 3 wherein said gradient detecting circuit comprises shift registers for delaying output signals of said registering means by one scanning time of said photoelectric converter, a serial/parallel conversion register for receiving the output signals of said registering means directly or through the shift registers, and subtracters, whereby said shift registers and serial/parallel conversion register cooperate to select pixels in synchronism with an output signal of said window region establishing circuit, said signals corresponding to two of the selected pixel are subtracted from each other by each subtracter to detect a gradient.

10. An apparatus for checking the geometry of patterns comprising:
   two photoelectric converters receiving images of two patterns on an object to be checked and producing two detection signals used for comparing the images with each other;
   registering means for correcting misregistration between the two detection signals on the basis of differences therebetween;
   a difference image window region establishing and threshold circuit for recognizing differences between the two corrected detection signals as defect candidates to apply a window on the defect candidates and to convert the differences into binary signals;
   two gradient detecting circuits for detecting gradients of the corrected detection signal within the window; and a comparing circuit for comparing the two gradients to produce an output signal where the difference between the two gradients exceeds a predetermined value.

11. An apparatus according to claim 10 wherein said photoelectric converter comprises a linear image sensor.

12. An apparatus according to claim 10 wherein said difference image window region establishing and threshold circuit has a window of a size between 2×2 pixels and n×n pixels (n: natural number being not less than 3) which are practically determined by the processing speed.

13. An apparatus according to claim 10 wherein said difference image window region establishing and threshold circuit comprises a subtracter for receiving said two corrected detection signals, an exclusive OR element for exclusive ORing an output signal of the subtracter and a sign signal, a shift register for delaying an output signal of the exclusive OR element by one scanning time of said photoelectric converter, a serial/parallel conversion register for receiving the output signal of the exclusive OR element directly or through the shift register, an OR element for receiving output signals of the serial/parallel conversion register, and a comparator for comparing an output signal of the OR element with a predetermined threshold level.

14. An apparatus according to claim 10 wherein said gradient detecting circuit has a window of a size between 3×3 pixels and n×n pixels (n: natural number being more than 3).

15. An apparatus according to claim 10 wherein said gradient detecting circuit comprises shift registers for delaying output signals of said registering means by one scanning time of said photoelectric converter, serial/parallel conversion registers for receiving the output signals of said registering means directly or through the shift registers, and subtracters; whereby said shift registers and serial/parallel conversion registers cooperate to select pixels in synchronism with an output signal of said difference image window region establishing and threshold circuit, and signals corresponding to two of the selected pixels are subtracted from each other by each subtracter to detect a gradient.

16. A method of checking the geometry of patterns comprising:
a first step of receiving images of two patterns on an object to be checked to produce two detection signals used for comparing the images with each other and correcting misregistration between the two detection signals;
a second step of comparing two corrected detection signals, converting differences between the two corrected detection signals into binary signals and applying a window on the binary signals; and
a third step of comparing the two corrected detection signals to detect gradients within the window and comparing the gradients to detect only a defect under no influence of the misregistration.

17. A method according to claim 16 wherein when linear image sensors receive the images, said first step comprises the step of effecting a two-dimensional scanning on the basis of self-scanning of the linear image sensors and movement of an X-Y stage carrying the object to be checked.

18. A method of checking the geometry of patterns comprising:
a first step of receiving images of two patterns on an object to be checked to produce two detection signals used for comparing the images with each other and correcting misregistration between the two detection signals;
a second step of comparing two corrected detection signals, applying a window on differences between the two corrected detection signals and converting the differences into binary signals; and
a third step of comparing the two corrected detection signals to detect gradients within the window and comparing the gradients to detect only a defect under no influence of the misregistration.

19. A method according to claim 18 wherein when linear image sensors receive the images, said first step comprises the step of effecting a two-dimensional scanning on the basis of self-scanning of the linear image sensors and movement of an X-Y stage carrying the object to be checked.

20. A method of checking the geometry of multi-layer patterns for IC structures having identical functions, each said multi-layer pattern for an IC structure including a plurality of layer patterns arranged in different level layers, the method comprising the steps of:
(a) registering a multi-layer pattern for a first any one of said IC structures with that for a second any one of said IC structures with respect to a first one of said plurality of layer patterns;
(b) comparing said registered multi-layer patterns to determine substantially matched and substantially unmatched portions with respect to said first one layer pattern;
(c) removing said matched portion out of those parts of patterns which are to be checked;
(d) repeating said steps (a) to (c) with respect to the remaining layer patterns of said multi-layer patterns for said first and second IC structures; and
(e) determining any finally substantially unmatched portion of said multi-layer pattern as a defect in a corresponding one of said multi-layer patterns under a checking operation.

21. A method of checking the geometry of multi-layer patterns for IC structures having identical functions, each said multi-layer pattern for an IC structure including a plurality of layer patterns arranged in different level layers, the method comprising the steps of:
(a) producing electric image signals from optical images of multi-layer patterns for any two of said IC structures, each of said electric image signals including image signal portions corresponding to said plurality of layer patterns for its associated IC structure;
(b) registering said electric image signals with each other with respect to one of said signal portions;
(c) comparing said registered electric image signals with each other to discriminate their substantially unmatched portions from substantially matched portions with respect to said one signal portion;
(d) masking said matched portions of said registered electric image signals so that any succeeding steps be performed at least on said unmatched portions of said electric image signals;
(e) repeating said steps (b) to (d) with respect to the remaining signal portions of said electric image signals; and
(f) producing a defect detection signal representative of any finally substantially unmatched portion of said electric image signals.

22. An apparatus for checking the geometry of multi-layer patterns for IC structures having identical functions, said each multi-layer pattern for an IC structure including a plurality of layer patterns arranged in defferent level layers, the apparatus comprising:
- first and second image sensing means for converting optical images of multi-layer patterns for any two of said IC structures to electric image signals, each of said electric image signals including signal portions corresponding to said plurality of layer patterns for its associated structure;
- a plurality of unmatching detecting circuits connected in series, the most preceding one of said series-connected unmatching detecting circuits being connected with said first and second image sensing means to receive therefrom said electric image signals without substantial time delay;
- masking circuits each interconnected between adjacent two of said series-connected unmatching detecting circuits; and
- means connected with said first and second image sensing means for delaying said electric image signals, said delaying means being further connected with each of said masking circuits and each of said series-connected unmatching detecting circuits except the most preceding one to supply delayed signals produced from one of said electric image signals fed to said delaying means to said masking circuits so that each of said delayed signals is passed to that one of the associated unmatching detecting circuits which succeeds to the other one under control of the output of said other one unmatching detecting circuit and to supply delayed signals produced from the other one of said electric image signals to said unmatching detecting circuits, the delay time for said delayed signals to be supplied from said delaying means to one of said gate circuits and one of said unmatching detecting circuits being shorter for more preceding ones.

23. An apparatus according to claim 22, in which the number of said plurality of unmatching detecting circuits is not smaller than the number of said plurality of layer patterns arranged in different level layers.

24. An apparatus according to claim 22, in which:
- each of said unmatching detecting circuits including registering means and matched portion removing means;
- in the most preceding one of said unmatching detecting circuits, the registering means is connected with said first and second image sensing means to receive therefrom said electric image signals without substantial time delay and serving to register said electric image signals with each other with respect to one of said signal portions while said matched portion removing means includes a comparator for comparing the registered image signals fed from said registering means to produce a difference signal and a discriminator connected for reception of said difference signal from said comparator to produce a discrimination signal indicative of whether said difference signal exceeds a predetermined reference value or not, said discrimination signal being fed to the masking circuit connected with said most preceding unmatching detecting circuit;
- in each of the other unmatching detecting circuits, the registering means is connected with its associated masking circuit and said delaying means to receive therefrom said delayed electric image signals and serving to register said delayed electric image signals with each other with respect to different one of said signal portions while said matched portion removing means includes a comparator for comparing the registered image signals fed from said registering means to produce a difference signal and a discriminator connected for reception of said difference signal from said comparator to produce a discrimination signal indicative of whether said difference signal exceeds a predetermined reference value or not.

25. An apparatus according to claim 24, in which each of said unmatching detecting circuits includes first and second edge detectors for processing said electric image signal portions of two layer patterns to generate edge detection signals indicative of edges of said layer patterns, a misregistration detecting circuit responsive to said edge detection signals for detecting misregistration between said two electric image signal portions and producing a shift signal indicative of an amount of shift of one of said electric image signal portions for said two layer patterns with respect to the other electric image signal, said shift amount causing said misregistration to be minimum, first and second delay circuits for delaying said electric image signal portions, and a registration circuit responsive to said shift signal for registering said electric image signal portions, said first and second edge detectors in said most receding one of said unmatching detecting circuits being in electrical connection with said first and second image sensing means, respectively, and said first and second edge detectors in each of said other unmatching detecting circuits being in electrical connection with said masking circuit and said delaying means, respectively.

26. A method of checking the geometry of patterns for IC structures having identical functions, comprising the steps of:
- registering a pattern for a first any one of said IC structures with that for a second any one of said IC structures;
- comparing the registered patterns for said first and second IC structures to detect differences therebetween;
- comparing said differences with a predetermined threshold value;
- determining gradients for each of said registered patterns;
- establishing a window region for said registered patterns, said window region being narrower than the area of said patterns and being movable over said patterns;
- detecting whether differences larger than said predetermined threshold value exist all over said window region;
- comparing gradients for the pattern for said first IC structure with corresponding gradients for the pattern for said second IC structure when differences larger than said predetermined threshold value exist all over said window region; and
- producing a defect dtection signal when said comparison of gradients results in a substantial difference.

27. An apparatus for checking the geometry of patterns for IC structures having identical functions, comprising:
- first and second image sensing means for converting optical images of patterns for any two of said IC structures to electric image signals;

means for registering said electric image signals with each other;

first comprising means connected with said registering means for comparing said registered electric image signals to produce an error signal representative of differences between said registered electric image signals;

means connected with said first comparing means for determining whether the magnitudes of said error signal exceeds a predetermined threshold value or not;

means responsive to the output of said determining means for establishing a window region covering portions for said electric image signals which portions correspond to an area for said optical images;

means connected with said registering means for detecting gradients for said registered electric image signals under control of the output of said window region establishing means; and second comparing means for comparing the detected gradients for said registered electric image signals to produce a defect detection signal when the comparison of the gradients results in a substantial difference.

28. A method of checking the geometry of multi-layer patterns for IC structures having identical functions, each said multi-layer pattern for an IC structure including a plurality of layer patterns arranged in different level layers, the method comprising the steps of:

(a) producing electric image signals from optical images of multi-layer patterns for any two of said IC structures, each of said electric image signals including image signal portions corresponding to said plurality of layer patterns for its associated IC structure;

(b) registering said electric image signals with each other with respect to one of said signal portions;

(c) comparing said registered electric image signals with each other to discriminate their substantially unmatched portions from substantially matched portions with respect to said one signal portion;

(d) masking said matched portions of said registered electric image signals so that any succeeding steps be performed at least one said unmatched portions of said electric image signals;

(e) repeating said steps (b) to (d) with respect to the remaining signal portions of said electric image signals;

(f) determining gradients for each of said registered electric image signals;

(g) comparing gradients for the registered electric image signal for one of said two IC structures with corresponding gradients for the registered electric image signal for the other one IC structure; and (h) producing a defect detection signal when said comparison of gradients results in a substantial difference.

29. An apparatus for checking the geometry of multi-layer patterns for IC structures having identical functions, said each multi-layer pattern for an IC structure including a plurality of layer patterns arranged in different level layers, the apparatus comprising:

at least one image sensing means for converting optical images of multi-layer patterns for said IC structures to electric image signals, each of said electric image signals including signal portions corresponding to said plurality of layer patterns for its associated structure;

image memory means in an electrical connection with said image sensing means for storing therein image information contained in the output of said image sensing means, said image memory means being capable of being accessed to deliver electric image signals;

a plurality of unmatching detecting circuits connected in series each including means for registering electric image signals with each other, means for comparing said registered electric image signals fed from said registering means to produce a discrimination signal and means responsive to said discrimination signal for producing a defect detection signal, the registering means in the most preceding one of said series-connected unmatching detecting circuits being connected with said image sensing means and said image memory means to receive therefrom electric image signals to be checked, the registering means and comparing means in each of the other unmatching detecting circuits having a first masking circuit and a second masking circuit, respectively, the output of the registering means in one unmatching detecting circuit except in the most succeeding one being fed to the registering means in the immediately succeeding unmatching detecting circuit; and a plurality of first delay means and a plurality of second delay means provided one first delay means and one second delay means for each adjacent two of said series-connected unmatching detecting circuits, said first and second delay means being arranged to receive the output of the comparing means in the preceding one of the adjacent two unmatching detecting circuits and to supply delayed outputs to the first and second masking circuits, respectively, in the succeeding one of the adjacent two unmatching detecting circuits so that registration and comparison by the registering and comparing means in the succeeding unmatching detecting circuit with respect to those portions of said registered electric image signals which have already been registered and discriminated as matched in the preceding unmatching detecting circuit are not repeated.

30. An apparatus according to claim 29, in which said defect detection signal producing means in each of said unmatching detecting circuits includes a detector responsive to the output of said comparing means for detecting gradients of each of said registered electric image signals fed from said registering means and a comparator for comparing the detected gradients to produce said defect detection signal when the comparison results in a substantial difference.

* * * * *